(12) United States Patent
Takimoto

(10) Patent No.: US 6,414,692 B1
(45) Date of Patent: Jul. 2, 2002

(54) GRAPHICS PROCESSING APPARATUS AND SYSTEM

(75) Inventor: Munenori Takimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/271,244

(22) Filed: Mar. 17, 1999

(30) Foreign Application Priority Data

Mar. 19, 1998 (JP) ............................................ 10-070777
Feb. 5, 1999 (JP) ............................................ 11-029235

(51) Int. Cl.[7] .............................. G06F 1/00; G06T 1/00; G06T 15/00

(52) U.S. Cl. ....................... 345/620; 345/502; 345/522; 345/536; 345/552

(58) Field of Search ................................ 345/619, 620, 345/621, 622, 623, 624, 681, 682, 501, 502, 503, 522, 530, 531, 532, 536–539, 547, 556, 559, 561–562, 565, 506, 520, 540, 421, 572, 589, 629, 418

(56) References Cited

U.S. PATENT DOCUMENTS

| | | | | |
|---|---|---|---|---|
| 5,315,696 A | * | 5/1994 | Case et al. ................... | 345/522 |
| 5,315,698 A | * | 5/1994 | Case et al. ................... | 345/522 |
| 5,321,810 A | * | 6/1994 | Case et al. ................... | 345/522 |
| 5,440,682 A | * | 8/1995 | Deering ....................... | 345/562 |
| 5,517,611 A | * | 5/1996 | Deering ....................... | 345/503 |
| 5,541,396 A | * | 7/1996 | Rentsch ....................... | 235/454 |
| 5,717,440 A | * | 2/1998 | Katsura ....................... | 345/513 |
| 6,141,025 A | * | 10/2000 | Oka ............................ | 345/521 |

* cited by examiner

Primary Examiner—Matthew Luu
Assistant Examiner—Wesner Sajous
(74) Attorney, Agent, or Firm—Staas & Halsey LLP

(57) ABSTRACT

A graphics processing apparatus includes a drawn field register which stores coordinate values of boundaries of a drawn field, and an end point coordinate register which stores coordinate values of end points of a graphical element of interest. A first comparator compares the coordinate values of the boundaries of the drawn field with the coordinate values of the end points of the graphical element of interest. A comparison result register stores comparison results output by the first comparator. A decoder determines, based on the comparison results, whether the graphical element of interest should be drawn in the drawn field.

20 Claims, 27 Drawing Sheets

FIG. 2

```
        XOR Code, Code
        CMP X, Xmax
        BGT label1
        OR Code, 1
label1: CMP Xmin, X
        BGT label2
        OR Code, 2
label2: CMP Y, Ymax
        BGT label3
        OR Code, 4
label3: CMP Ymin, Y
        BGT label4
        OR Code, 8
label4:
```

FIG. 3

```
        OR C0, C1
        BZ draw
        AND C0, C1
        BNZ draw_skip
        JUMP clip
```

GRAPHICS PROCESSING APPARATUS AND SYSTEM

BACKGROUND OF THE INVENTION

Field of the Invention

The present invention generally relates to graphics processing apparatuses and systems, and more particularly to a graphics processing apparatus and a system having the function of selecting graphics elements to be drawn and graphics elements not to be drawn from each other when a figure is drawn on a graphical display device such as a CRT (cathode-ray tube) or an LCD (liquid crystal display) by computer graphics.

When figures generated by computer graphics processing are drawn on a display device, it is not necessarily required to display a graphics element located out of the virtual view space on the display and perform graphics data processing for such a graphics element. Hence, it is possible to reduce the time necessary for figures drawing by selecting only graphics elements to be drawn on the display and performing data processing for the selected graphics elements.

Recently, there has been high activity in computer graphics and there has been a need for a graphics processing apparatus capable of selecting only graphics elements to be drawn at a high speed and thus realizing high-speed drawing. The selected graphics elements form the overall figure or part of the figure.

Conventionally, the selection of the graphics elements to be drawn is implemented by a program describing a sequence of processes executed by a general-purpose processor such as a microprocessor or a DSP (Digital Signal Processor) of the graphics processing apparatus. The process sequence commences recognizing the positions of the end points of graphics elements on a plane or space partitioned into drawn fields and non-drawn fields. Next, it is determined whether each graphics element should be drawn on the basis of the positional relationship between the fields in which the end points are located. Then, only the graphics elements determined to be drawn are actually drawn.

FIG. 1 shows a plane 100 partitioned into a drawn field 101 and non-drawn fields 102–109. The plane 100 is partitioned into nine fields by four straight lines X1, X2, Y1 and Y2. The nine fields are assigned different field codes (0000)–(1010). The drawn field 101 in which a graphics element can be drawn is the field surrounded by the four straight lines X1, X2, Y1 and Y2. Each of the field codes consists of four binary digits. When a point is assigned one of the nine field codes, the point is located in the corresponding field on the plane 100.

When a position on the plane 100 is expressed by coordinates (X, Y), the straight lines X1 and X2 are respectively those which indicate the minimum value Xmin and the maximum value Xmax of the X coordinate of the drawn field 101. Similarly, the straight lines Y1 and Y2 are respectively those which indicate the minimum value Ymin and the maximum value Ymax of the Y coordinate of the drawn field 101.

The least significant bit LSB of each field code assigned to the plane 100 is equal to 1) when X>Xmax on the coordinates (X, Y), and is equal to 0 when X≦Xmax. The second bit of each field code from the LSB thereof is equal to 0 when X<Xmin and is equal to 1 when X≧Xmin. The third bit of each field code from the LSB thereof is equal to 1 when Y>Ymax, and is equal to 0 when Y≦Ymax. The most significant bit MSB of each field code is equal to 0 when Y≦Ymin and is equal to 1 when Y<Ymin.

At the time of determining whether a graphics element should be drawn, the field codes of the end points of the outer shape of the graphics element on which a decision should be made are determined.

The process for determining the field code of each end point (X, Y) is carried out in accordance with a program as shown in FIG. 2, in which a character string "Code" denotes the field code.

The first line of the program shown in FIG. 2 means that the field code is reset to (0000). The second line describes the step of comparing Xmax and X with each other. The third line means that the process is jumped to label 1 described in the fifth line if Xmax≧X. The fourth line means that the LSB of the field code is set to 1.

The above sequence is repeatedly carried out with regard to the combinations of Xmin and X, Ymax and Y and Ymin and Y. After the field code of each end point is determined, a program process using the field codes is initiated to determine whether the graphics element of interest should be drawn.

It will now be assumed that the graphics element is a line AB, and field codes C0 and C1 are assigned to end point A (coordinates (X0, Y0)) and end point B (coordinates (X1, Y1)). The step of determining whether the line AB should be drawn is carried out in accordance with the program shown in FIG. 3.

The first line of the program shown in FIG. 3 describes an OR operation on the field codes C0 and C1. The second line describes that the process is moved to the step of drawing the line AB if the result of the OR operation indicates zero (C0=C1=0). The third line describes an AND operation on the field codes C0 and C1. The fourth line describes that the line AB is not drawn unless the result of the AND operation indicates zero. The fifth line describes that the process is moved to a clip process if the result of the AND operation is zero.

The clip process is a process in which the positional relationship between the drawn field 101 and the graphics element of interest, and if the graphics element is located in any of the non-drawn fields 102–109, only part of the graphics element located in the drawn field 101 is cut out and is drawn in the drawn field 101.

For example, if both the end points A and B of the line AB are located in the drawn field 101, the field codes C0 and C1 of the end points A and B are both (0000). In this case, the OR operation of the field codes C0 and C1 results in zero. Hence, the line AB is drawn. If the end points A and B are respectively located in the non-drawn fields 102 and 104, the field codes C0 and C1 are respectively (0110) and (0101), and the AND operation thereon results in zero. Hence, the line AB is not drawn. If the end points A and B are respectively located in the drawn fields 101 and 108 and the field code of the end point B is (1000), the AND operation on the field codes results in zero. Hence, the line AB is subjected to the clip process, in which part of the line AB located in the drawn field 101 is selected and is then drawn.

The above-mentioned program can select the graphics elements to be drawn and those not to be drawn from each other and can further select the graphics elements that should be subjected to the clip process.

However, the above-mentioned conventional program has a disadvantage in that the positional relationship between each end point and the boundary lines defining the drawn field 101 are investigated and each of the end points is assigned the respective field code. Hence, the conventional program needs a huge number of steps, and it takes a very long time to complete the process of the program. This prevents speeding up the process of the graphics processing apparatus.

SUMMARY OF THE INVENTION

It is a general object of the present invention to provide a graphics processing apparatus and a system in which the above disadvantages are eliminated.

A more specific object of the present invention is to provide a graphics processing apparatus and a system having the function of selecting graphics elements which are, for example, figures or parts thereof to be drawn at a higher speed and being capable of drawing figures at a higher speed.

The above objects of the present invention are achieved by a graphics processing apparatus or system comprising: a drawn field register which stores coordinate values of boundaries of a drawn field; an end point coordinate register which stores coordinate values of end points of a graphical element of interest; a first comparator which compares the coordinate values of the boundaries of the drawn field with the coordinate values of the end points of the graphical element of interest; a comparison result register which stores comparison results output by the first comparator; and a decoder which determines, based on the comparison results, whether the graphical element of interest should be drawn in the drawn field.

The above objects of the present invention are also achieved by a system having the above structural elements and further including a coprocessor implementing the drawn field register, the end point coordinate register, and the first comparator; and a main processor implementing the comparison result register and the decoder.

BRIEF DESCRIPTION OF THE DRAWINGS

Other objects, features and advantages of the present invention are achieved by the following detailed description when read in conjunction with the accompanying drawings, in which:

FIG. 2 illustrates a conventional program for determining a field code assigned to each end point (X, Y);

FIG. 3 illustrates a conventional program for determining whether a line AB should be drawn;

DESCRIPTION OF THE PREFERRED EMBODIMENTS

Figure 4:
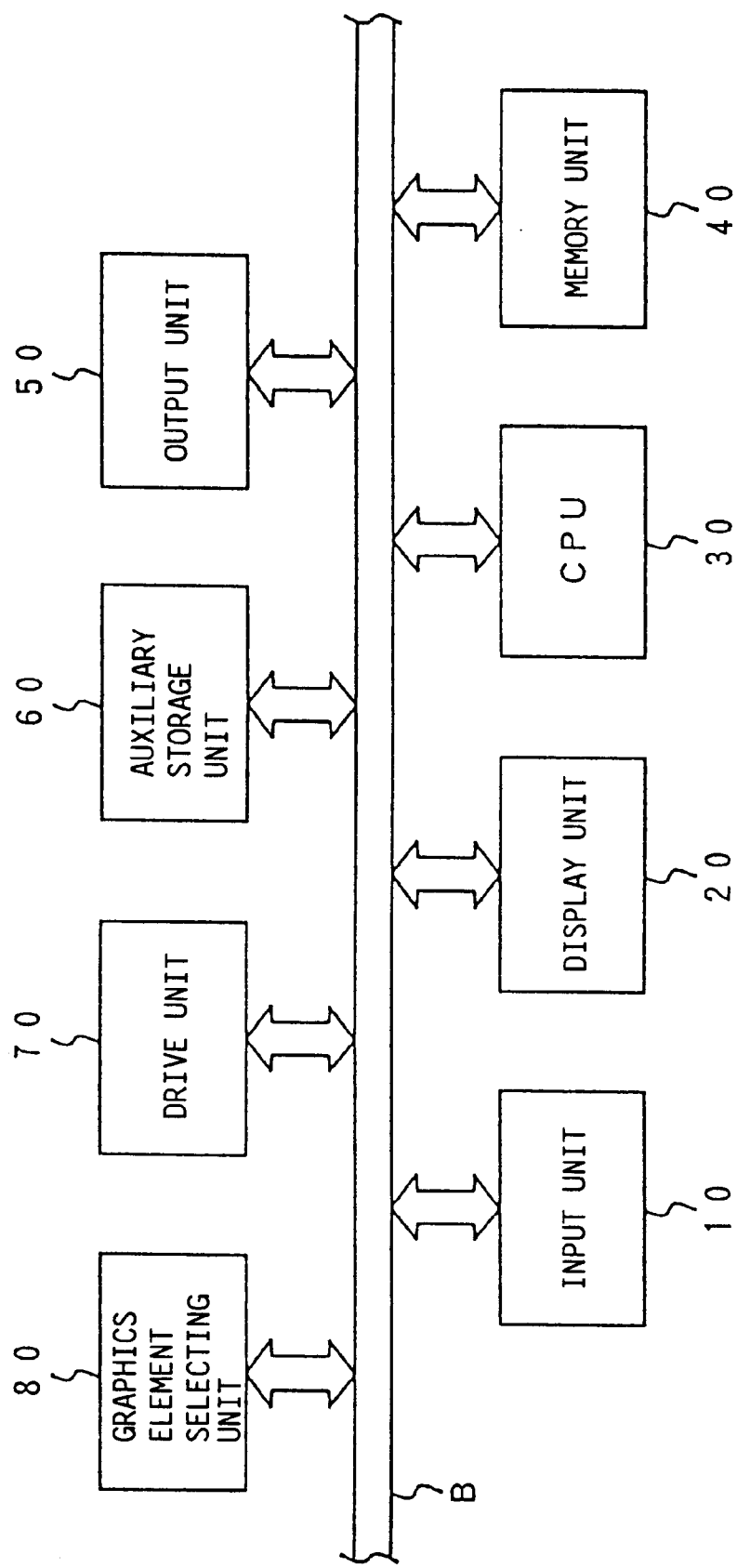
FIG. 4 is a block diagram of a hardware structure of a computer system to which the present invention is applied.

FIG. 4 is a block diagram of a computer system which realizes a graphics processing apparatus 1 equipped with a graphics element selecting unit 80, which is based on a hardware structure.

The computer system shown in FIG. 4 an input unit 10, a display unit 20, a CPU (Central Processing Unit) 30, a memory unit 40, an output unit 50, an auxiliary storage unit 70, a drive unit 70, and the graphics element selecting unit 80, all of which units are connected together through a bus B.

The input unit 10 has a keyboard and a mouse operated by the user and is used to input information concerning figures (graphics information) and conditions for drawing figures. The display unit 20 displays information input through the input unit 10 and figures. The CPU 30 controls the operations of the structural elements of the system. The memory unit 40 includes an area used for generating figures (graphics elements) to be drawn and corrections thereof. The output unit 50 prints out the figures drawn in response to a request from the user.

A program for drawing figures using the graphics processing apparatus 1 can be provided by a recording medium such as a CD-ROM. When such a recording medium is loaded to the drive unit 70, the program stored therein is read therefrom and is installed into the auxiliary storage unit 60 via the drive unit 70. Hence, the graphics processing apparatus 1 shifts to the operable state. The auxiliary storage unit 60 stores information concerning various figures as well as the program executed when the graphics processing apparatus 1 operates.

The graphics element selecting unit 80 makes a decision as to whether a graphics element should be drawn. At the time of drawing figures, coordinates data indicative of the drawn field (the range in which figures can be drawn) and coordinates data of the graphics element of interest are input to the graphics element selecting unit 80 by input the data by the user or reading the data from the auxiliary storage unit 60.

The graphics element selecting unit 80 determines, using the input coordinates data, whether the figure element of concern should be drawn, and sends the result of the determination to the CPU 30. If the graphics element selecting unit 80 determines that the figure element of concern should be drawn, the CPU 30 causes the display unit 20 to display the graphics element. If not, the figure element is not drawn.

The graphics element selecting unit 80 may be implemented by the CPU 30 or may be provided in any unit.

A description will now be given of various structures of the graphics element selecting unit 80. The following description is directed to determining whether a line AB having end points A (X0, Y0) and B (X1, Y1) on a plane should be drawn. This plane is the same as the plane 100 described with reference to FIG. 1. As described previously, the plane 100 is partitioned into nine fields by the straight lines X1, X2, Y1 and Y2. The straight line X1 indicates the minimum value Xmin in the X-axis direction, and the straight line X2 indicates the maximum value Xmax therein. The straight line Y1 indicates the minimum value Ymin in the Y-axis direction, and the straight line Y2 indicates the maximum value Ymax.

Figure 5:
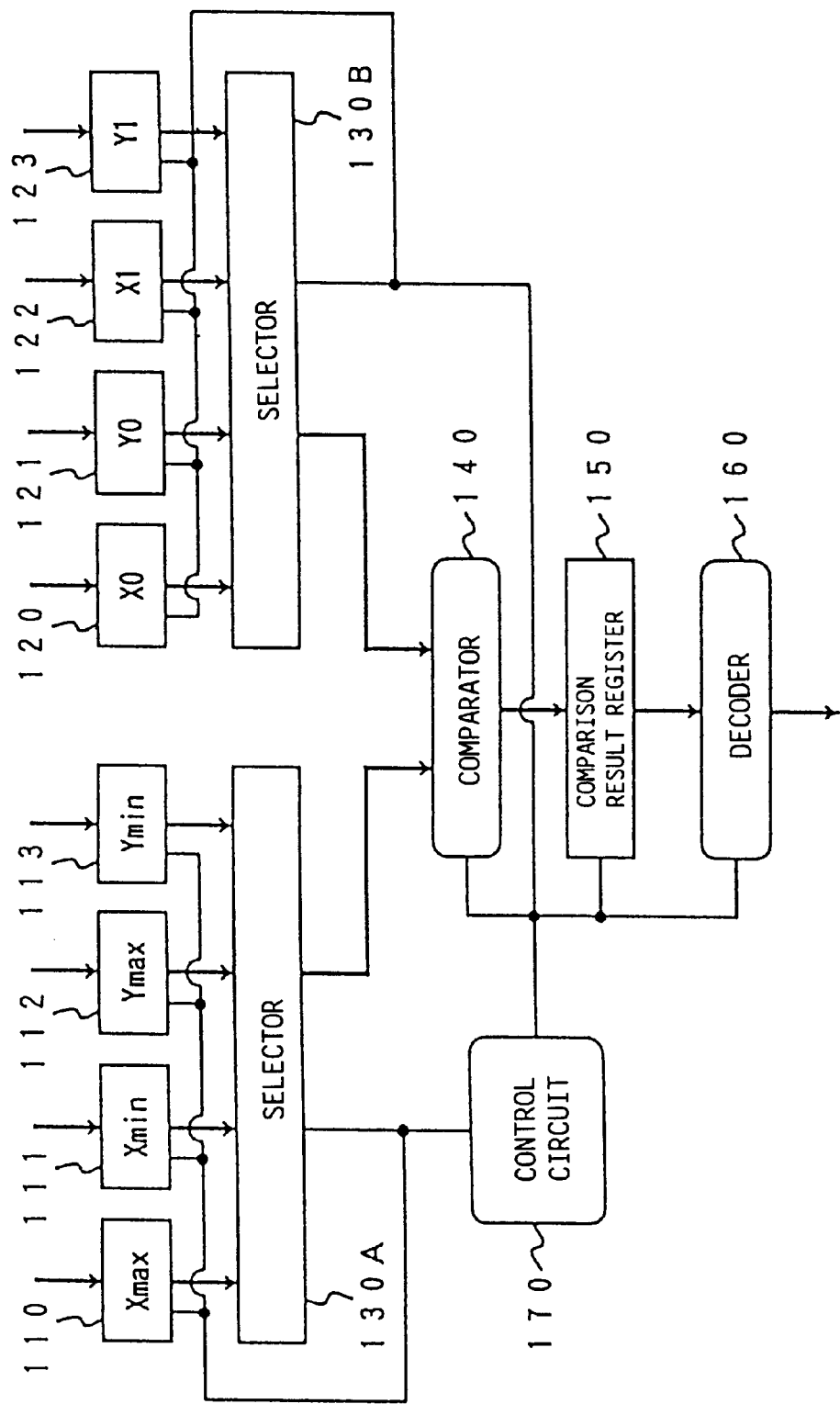
FIG. 5 is a block diagram of a graphics element selecting unit according to a first embodiment of the present invention.

FIG. 5 is a diagram of the overall structure of a graphics element selecting unit 80A according to a first embodiment of the present invention. The graphics element selecting unit 80A is made up of drawn field registers 110, 111, 112 and 113, end point coordinate register 120, 121, 122 and 123, selectors 130A and 130B, a comparator 140, a comparison result register 150, a decoder 160 and a control circuit 170.

Figure 1:
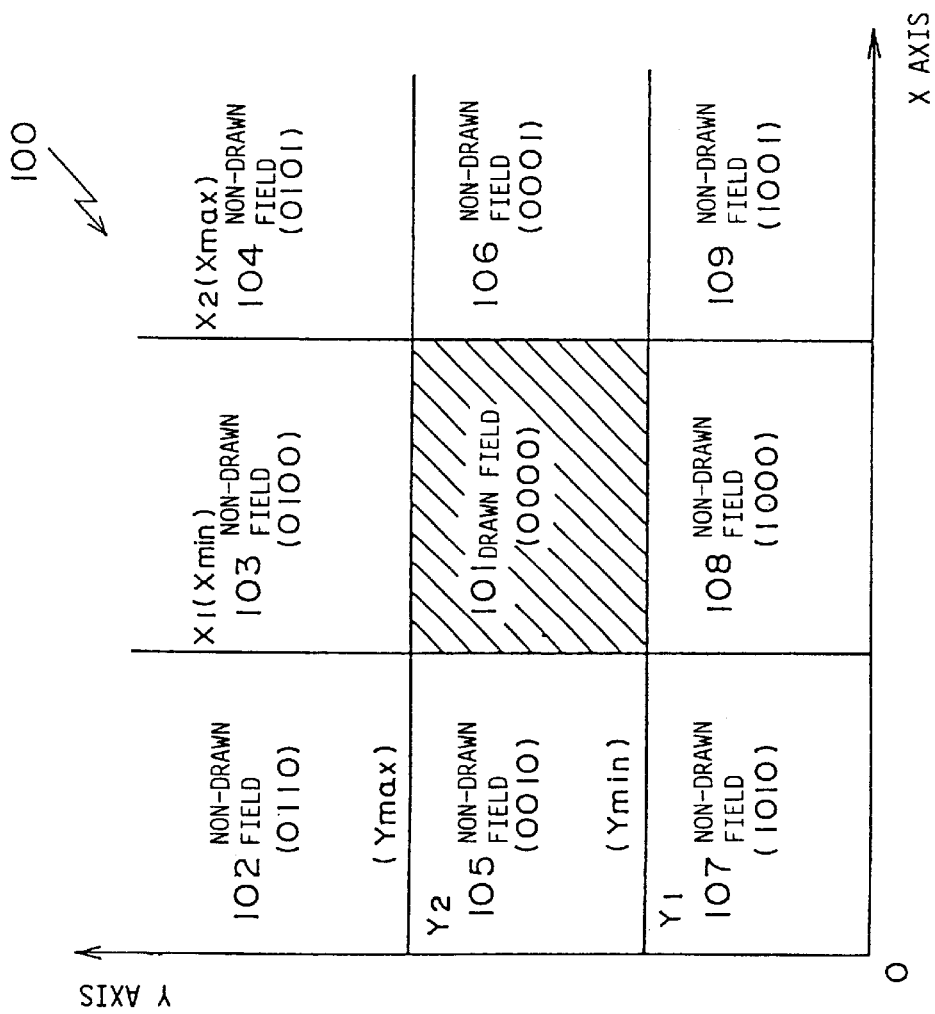
FIG. 1 illustrates a plane that is partitioned into a drawn field and non-drawn fields.

The drawn field registers 110 and 111 respectively store the minimum value Xmin and the maximum value Xmax of the drawn area 101 shown in FIG. 1 in the X-axis direction. Similarly, the drawn field registers 112 and 113 respectively store the minimum value Ymin and the maximum value Ymax of the drawn area 101 in the Y-axis direction. The end point registers 120, 121, 122 and 123 respectively store X0, Y0, X1 and Y1 which form the coordinates (X0, Y0) of the end point A of the line AB and the coordinates (X1, Y1) of the end point B.

Figure 6:
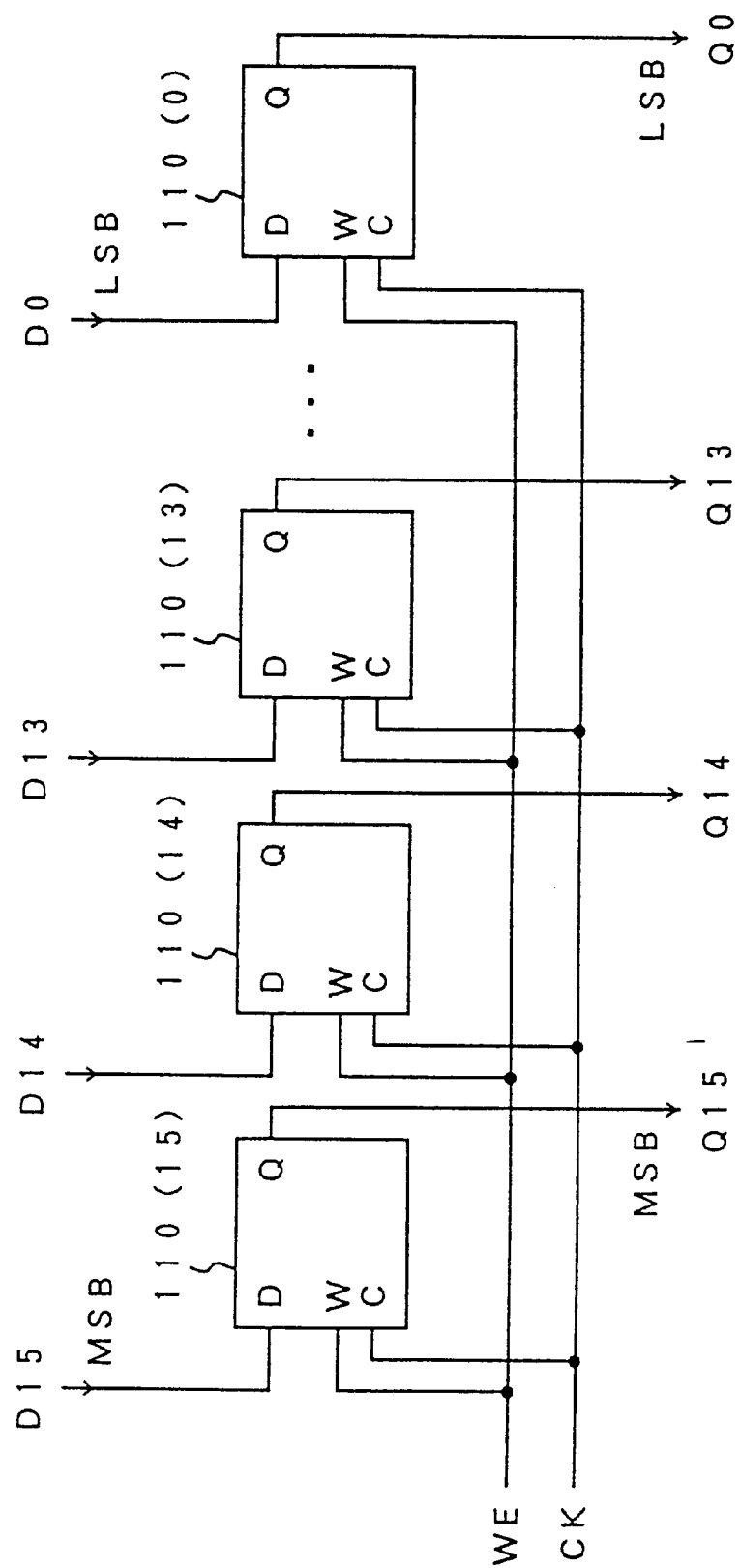
FIG. 6 is a block diagram of a drawn field register shown in FIG. 5.

FIG. 6 is a block diagram of a structure of the drawn field register 110. As shown in FIG. 6, the drawn field register 110 is a 16-bit register, and includes 16 D-type flip-flops (DFF) 110(0), 110(1), . . . , 110(15). Each of the flip-flops DFF has a write enable signal input terminal W, and a clock signal input terminal C. The write enable signal input terminal W receives a write enable signal WE7 for controlling a data write from the control circuit 170 shown in FIG. 5. The clock signal input terminal C receives a clock signal CK for synchronizing circuit operations. Further, the flip-flops DFF have data input terminals D supplied with asynchronous data D0, D1, D2, . . . , and D15, and data output terminals Q via which data Q0, Q1, Q2, and Q15 synchronized with the clock signal CK are output.

With the above structure, the drawn field register 110 stores the binary data value Xmax described by 16 digits at maximum, and the binary data value Xmax can be output as synchronized data.

The other drawn field registers 111, 112 and 113 and the end point registers 120, 121, 122 and 123 are the same as the drawn field register 110, and thus a description thereof will be omitted here.

The number of bits of the above registers is not limited to 16, and an arbitrary number of bits can be used in accordance with, for example, the method of setting the coordinates on the plane 100.

The selector 130A shown in FIG. 5 selects one of the drawn field registers 110, 111, 112 and 113, and sends the data registered in the selected register to the comparator 140. The selector 130B selects one of the end point registers 120, 121, 122 and 123, and sends the data registered in the selected register to the comparator 140.

The comparator 140 shown in FIG. 5 compares the data values regarding the drawn field coming from the selector 130A with the data values regarding the end points A and B coming from the selector 130B. Then, the comparator 140 outputs data "0" or "1" based on the result of the comparison. The output data of the comparator 140 is "0" when $X0(X1) \leq Xmax$, $Xmin \leq X0(X1)$, $Y0(Y1) \leq Ymax$ or $Ymin \leq Y0(Y1)$, and is "1" when $X0(X1) > Xmax$, $X0(X1) < Xmin$, $Y0(Y1) < Ymin$ or $Y0(Y1) > Ymax$.

The output data of the comparator 140 is sent to the comparison result register 150. At this time, the field codes C0 and C1 of the end points A and B, each of the field codes being represented by a binary value of four digits.

Figure 7:
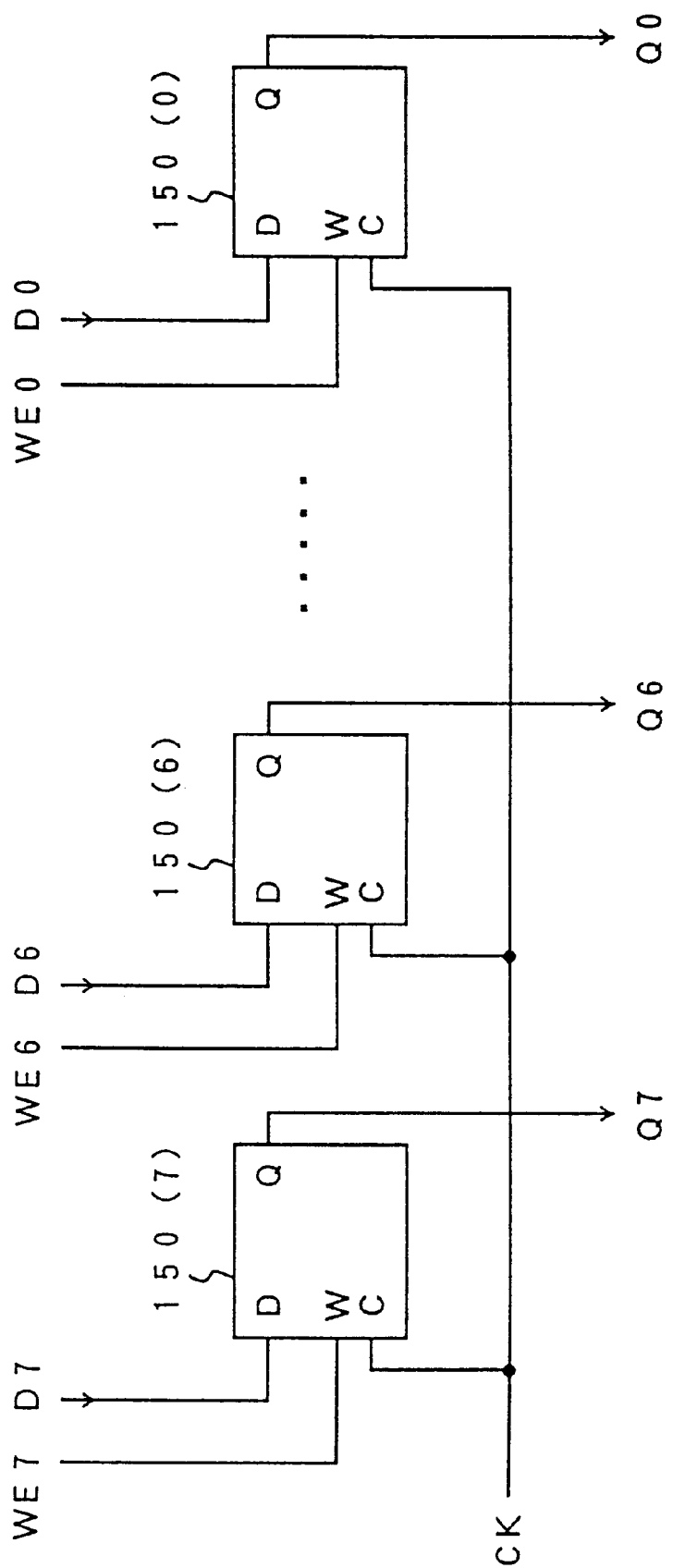
FIG. 7 is a block diagram of a comparison result register shown in FIG. 5.

FIG. 7 is a block diagram of a structure of the comparison result register 150. The comparison result register 150 is an eight-bit register, and includes eighth flip-flops DFF 150(0), 150(1), . . . , and 150(7) for storing the field codes C0 and C1 of the end points A and B of the line AB. Each of the flip-flop DFF has a write enable signal input terminal W, a clock signal input terminal C, a data input terminal D and a data output terminal Q. Data are written into the comparison result register 150 by write enable signals WE0, WE1, . . . , and WE7 respectively applied to the flip-flops 150(0), 150(1), . . . , and 150(7).

The results of the comparing operations on data values Xmax and X1, Xmin and X1, Ymax and Y1, and Ymin and Y1 performed by the comparator 140 are respectively supplied to the flip-flops 150(0), 150(1), 150(2) and 150(3). Similarly, the results of the comparing operations on data values Xmax and X0, Xmin and X0, Ymax and Y0, and Ymin and Y0 are respectively supplied to the flip-flops 150(4), 150(5), 150(6) and 150(7).

The high or low levels of the flip-flops 150(0), 150(1), 150(2) and 150(3) respectively represent the least significant bit LSB of the field code C1 of the end point B, the second digit therefrom, the third digit therefrom, and the most significant bit MSB. The high or low levels of the flip-flops 150(4), 150(5), 150(6) and 150(7) respectively represent the least significant bit LSB of the field code C0 of the end point A, the second bit therefrom, the third digit therefrom, and the most significant bit MSB.

The decoder 160 shown in FIG. 5 is supplied with the field codes C0 and C1 of the end points A and B from the comparison result register 150. Then, the decoder 160 determines whether the line AB should be drawn.

Figure 8:
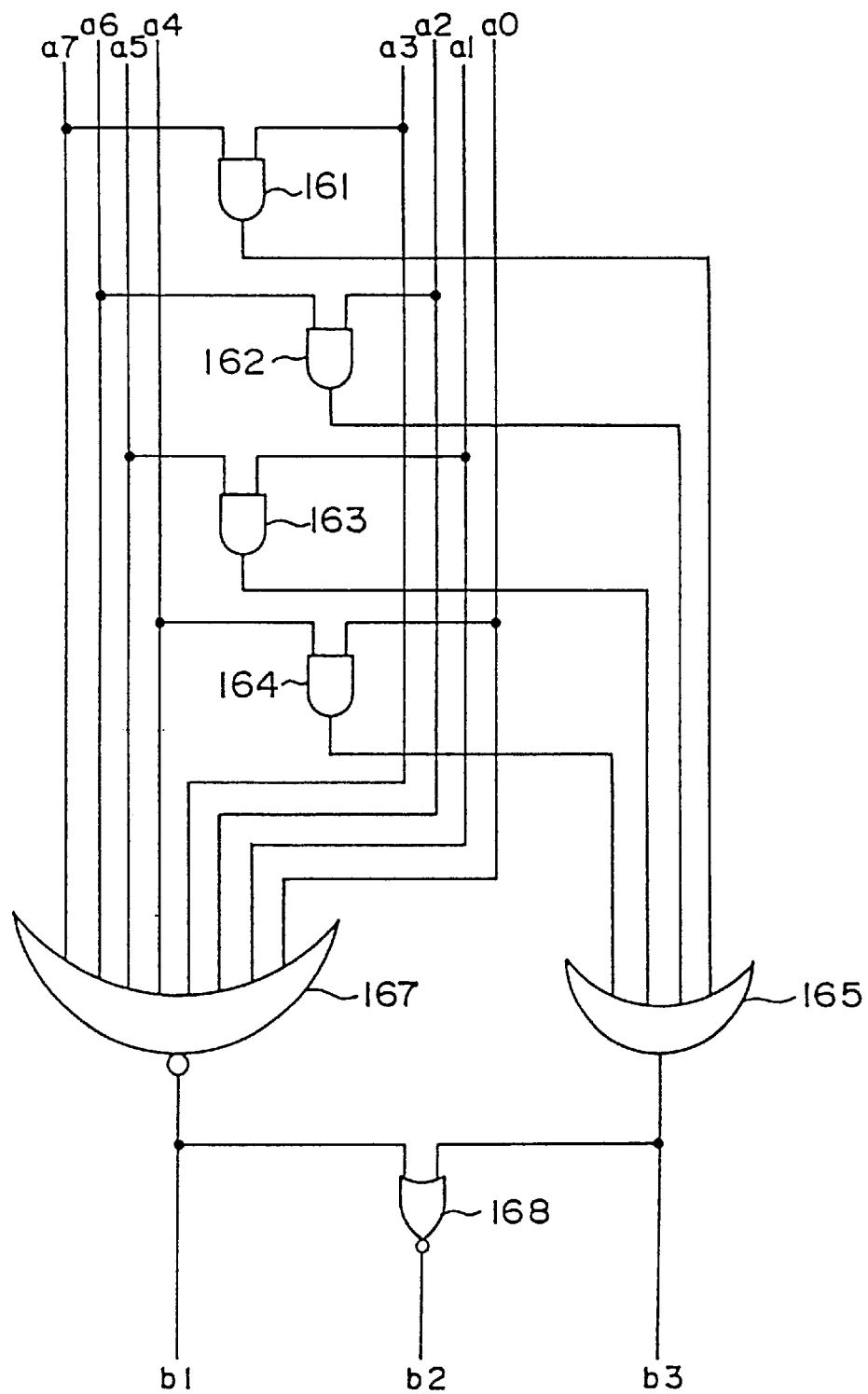
FIG. 8 is a circuit diagram of a decoder shown in FIG. 5.

FIG. 8 is a circuit diagram of a structure of the decoder 160. As shown in FIG. 8, the decoder 160 includes input terminals a0, a1, a2, a3, a4, a5, a6 and a7, AND circuits 161, 162, 163 and 164, an OR circuit 165, NOR circuits 167 and 168, and output terminals b1, b2 and b3. The input terminals a0, a1, a2 and a3 are respectively supplied with the LSB of the field code C1 of the end point B (X1, Y1), the second digit therefrom, the third digit therefrom and the MSB. The input terminals a4, a5, a6 and a7 are respectively supplied with the LSB of the field code C0 of the end point A (X0, Y0), the second digit therefrom, the third digit therefrom and the MSB.

The line AB is drawn if the data process of the decoder 160 results in "1" via the output terminal b1. The line AB is subjected to the clipping process if "1" is output via the output terminal b2. If "1" is output via the output terminal b3, the line AB is not drawn.

The control circuit 170 is connected to the drawn filed registers 110, 111, 112 and 113, the end point registers 120, 121, 122 and 123, the selectors 130A and 130B, the comparator 140, the comparison result register 150, and the decoder 160, and controls the respective operations thereof.

A description will be given of an operation of the graphics element selecting unit 80A.

Figure 9:
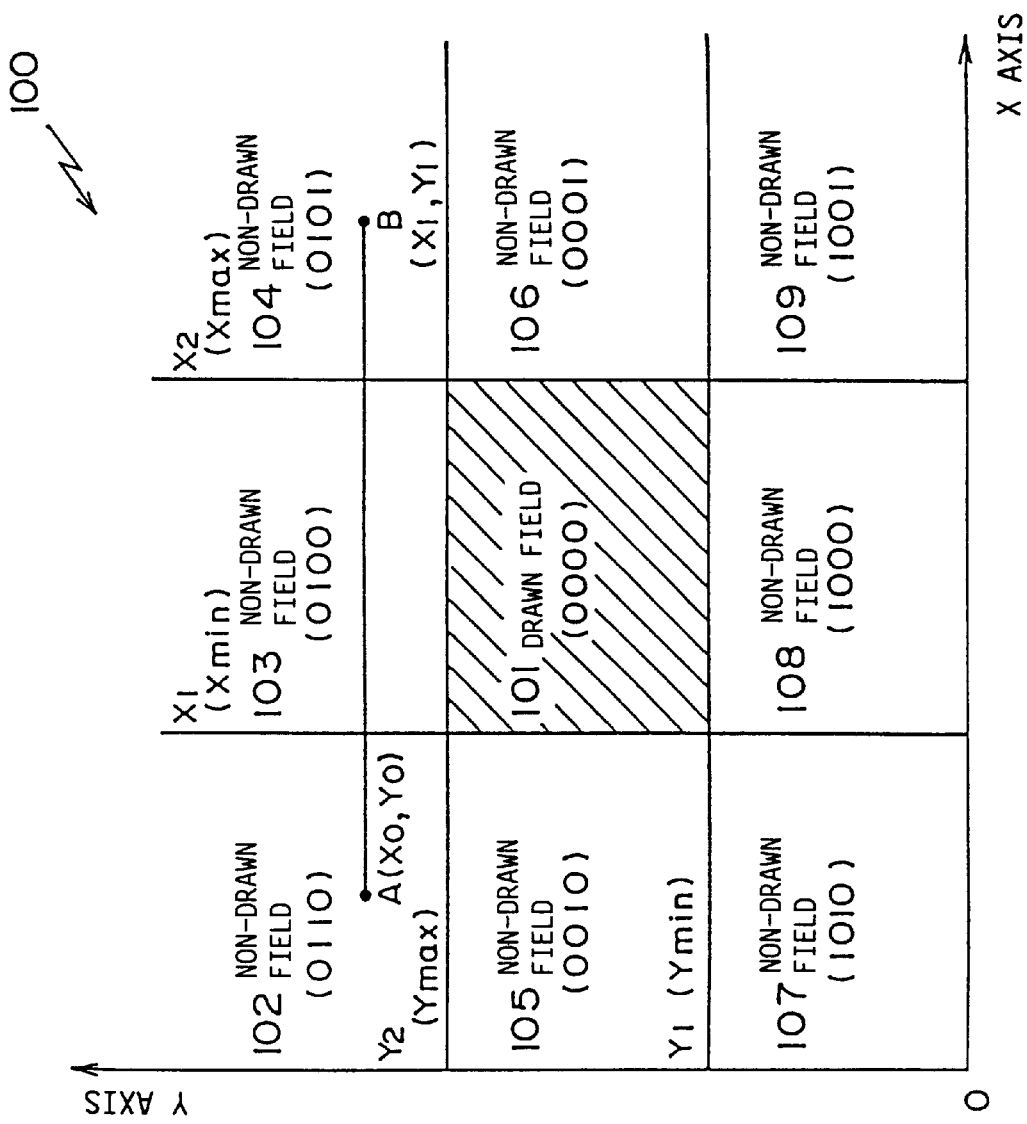
FIG. 9 shows a line AB on the plane.
Figure 10:
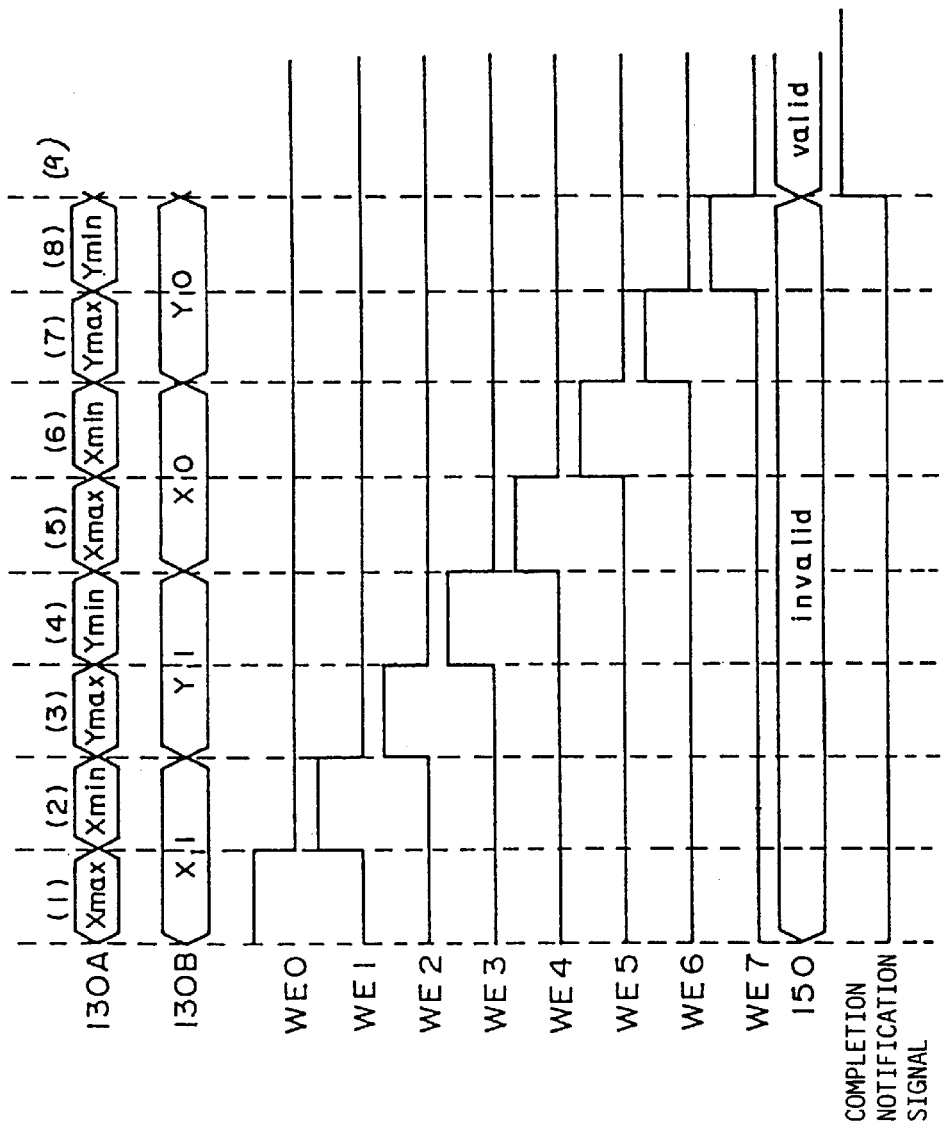
FIG. 10 is a timing chart of an operation of the graphics element selecting unit shown in FIG. 5.

FIG. 9 shows that line AB is present on the plane 100 which is partitioned into the drawn field 101 and the non-drawn fields 102, 103, . . . , and 109. FIG. 10 is a timing chart illustrating operations of the selectors 130A and 130B, the write enable signals WE0, WE1, WE2, WE3, WE4, WE5, WE6 and WE7, and an operation of the comparison result register 150. By referring to FIGS. 5 and 7–10, a description will be given of an operation of the graphics element selecting unit 80A related to the line AB located in the non-drawn fields 102 and 104.

When the drawn field 101 and the line AB which should be subjected to the decision making are determined, the coordinate data regarding the drawn field 101 are stored in the drawn field registers 110, 11, 112 and 113, and the coordinate data regarding the line AB are stored in the end point coordinate registers 120, 121, 122 and 123.

In cycle (1) shown in FIG. 10, the selectors 130A and 130B respectively obtain the data values Xmax and X1 from the registers 110 and 122, and send them to the comparator 140.

The comparator 140 compares the data values Xmax and X1 with each other. Since the end point B is located in the non-drawn field 104 and thus X1>Xmax, data "1" is supplied to the comparison result register 150. At this time, as shown in FIG. 10, the write enable signal WE0 applied to the flip-flop 150(0) forming the comparison result register 150 is at a high level. Hence, data "1" output from the comparator 140 is written into the flip-flop 150(0).

Subsequently, in cycle (2), the selectors 130A and 130B respectively obtain the data values Xmin and X1 from the registers 111 and 122, and send them to the comparator 140. Then, the comparator 140 compares the data values Xmin and X1 with each other. Since X1>Xmin, data "0" is supplied to the comparison result register 150. At this time, as shown in FIG. 10, the write enable signal WE1 applied to the flip-flop 150(1) is at the high level. Hence, data "0" output from the comparator 140 is written into the flip-flop 150(1).

In cycles (3)–(8), the comparator 140 compares the Mmax, Ymin, Xmax, Xmin, Ymax and Ymin with Y1, Y1, X0, X0, Y0 and Y0, respectively. Then, the flip-flops 150(7), 150(6), . . . , and 150(0) are supplied with 0, 1, 1, 0, 0, 1, 0 and 1, respectively. The four right-side bits (0110) of the above data train and the four left-side bits (0101) thereof respectively form the field codes of the end points A and B.

Since writing of data into the comparison result register 150 is in progress in cycles (1)–(8), outputting of data to the decoder 160 from the comparison result register 150 is not performed under the control of the control circuit 170 (an invalid state).

In cycle (9) in which all the bits of the comparison result register 150 have been supplied with data, a completion notification signal indicative of the above is sent to the comparison result register 150 from the control circuit 170. At this time, the comparison result register 150 is in a valid state in which the eight-bit data recorded in cycles (1)–(8) can be sent to the decoder 160, which receives them via the input terminals a0–a7.

In the decoder 160 shown in FIG. 8, the input terminals a7, a6, a5 and a4 are respectively supplied with the MSB, the second digit therefrom, the third digit therefrom and the LSB of the field code (0110) of the end point A. The input terminals a3, a2, a1 and a0 are supplied with the MSB, the second digit therefrom, the third digit therefrom and the LSB of the field code (0101) of the end point B. In this case, data "1" is output via the output terminal b3. Hence, it is determined that the line AB is not needed to be drawn.

The graphics processing apparatus 1 thus configured has the graphics element selecting unit 80A including the end point coordinate registers 120, 121, 122 and 123 and the decoder 160. Hence, it is no longer needed to use a program having a huge number of steps as has been described previously with reference to FIGS. 1 through 3. Hence, it is possible to determine whether the graphics element of interest should be drawn at a higher speed.

Figure 11:
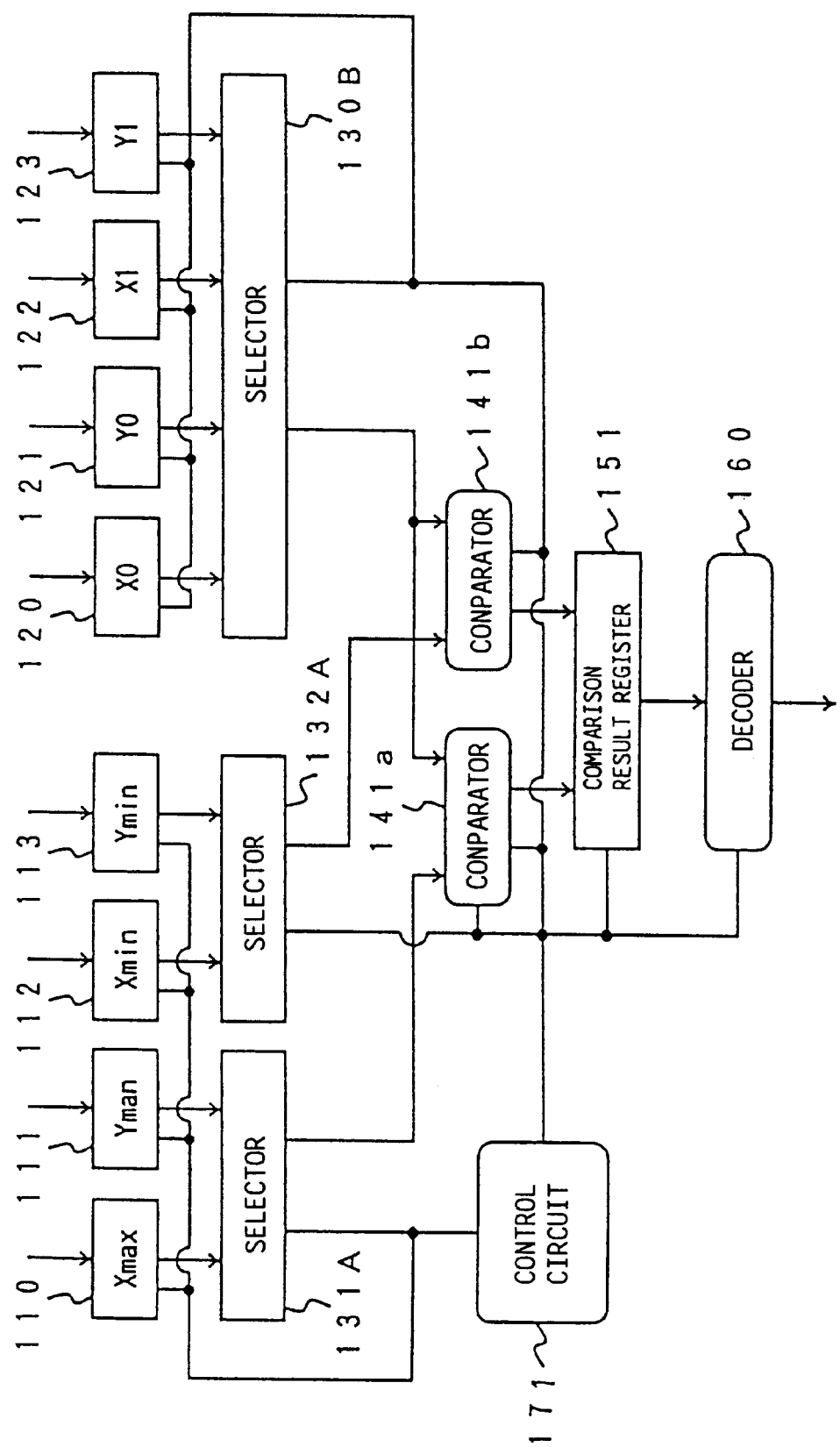
FIG. 11 is a block diagram of a graphics element selecting unit according to a second embodiment of the present invention.

FIG. 11 is a block diagram of an overall structure of a graphics element selecting unit 80B according to a second embodiment of the present invention. In FIG. 11, parts that are the same as those shown in the previously described figures are given the same reference numbers. The unit 80B is made up of the drawn field registers 110–113, the end point coordinate registers 120–123, selectors 131A, 132A and 130B, comparators 141$a$ and 141$b$, the comparison result register 151, the decoder 160 and a control circuit 171. The control circuit 171 controls the above-mentioned units as in the case of the control unit shown in FIG. 5.

The selector 131A selects the drawn field register 110 or 111, and sends data stored in the selected register to the comparator 141$a$. The selector 132A selects the drawn field register 112 or 113, and sends data stored in the selected register to the comparator 141$b$.

The comparator 141$a$ receives data from the selectors 131A and 130B, and the comparator 141$b$ receives data from the selector 132A and 130B. Then, each of the comparators 141$a$ and 141$b$ compares the received data with each other, and outputs either "0" or "1" based on the respective comparison result. The output signal of the comparator 141$a$ is "0" when X0(X1)≦Xmax or Y0(Y1)≦Ymax and is "1" when X0(X1)>Xmax or Y0(Y1)>Ymax. The output signal of the comparator 141$b$ is "0" when Xmin≦X0(X1) or Ymin≦Y0(Y1), and is "1" when X0(X1)<Xmin or Y0(Y1)<Ymin.

Figure 12:
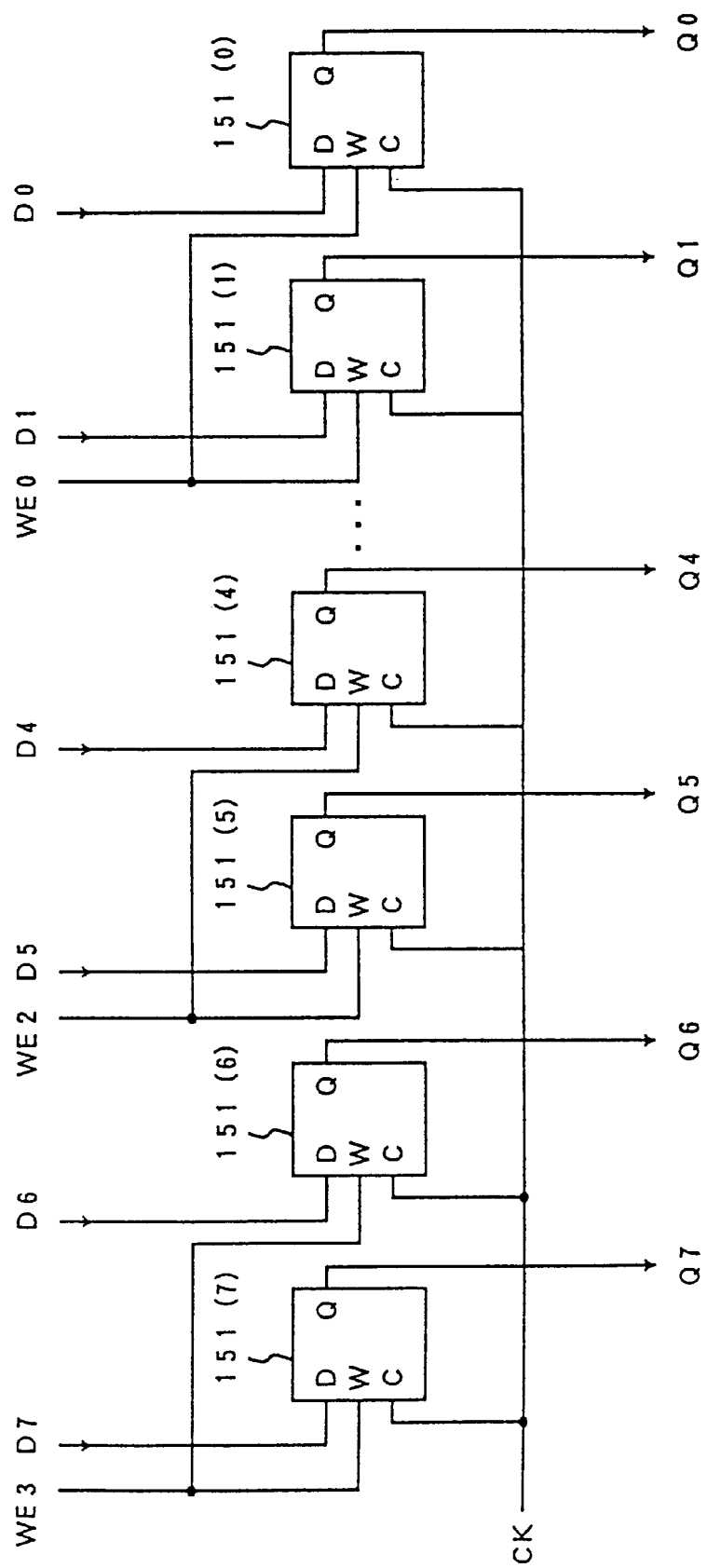
FIG. 12 is a block diagram of a comparison result register shown in FIG. 11.

FIG. 12 is a block diagram of the comparison result register 151, which is an eight-bit register having the same configuration as the comparison result register 150 used in the graphics element selecting unit 80A. The register 151 includes eight flip-flops DFF 151(0), 151(1), . . . , and 151(7), each of which has a write enable signal input terminal W, a clock signal input terminal C, a data input terminal D, and a data output terminal Q. The comparison result register 151 differs from the comparison result register 150 in that each of the write enable signals WE0, WE1, WE2 and WE3 is applied to respective two adjacent bits so that the write control is performed every two bits. More particularly, the write enable signal WE0 is applied to the write enable signal input terminals W of the flip-flops 151(0) and 151(1), and the write enable signal WE1 is applied to the write enable signal input terminals W of the flip-flops 151(2) and 151(3). Further, the write enable signal WE2 is applied to the write enable signal input terminals W of the flip-flops 151(4) and 151(5), and the write enable signal WE3 is applied to the write enable signal input terminals W of the flip-flops 151(6) and 151(7).

The results of the comparing operations on Xmax and X1, Ymax and Y1, Xmax and X0, and Ymax and Y0 performed by the comparator 141a are input to the flip-flops 151(0), 151(2), 151(4) and 151(6), respectively. Similarly, the results of the comparing operations on Xmin and X1, Ymin and Y1, Xmin and X0, and X0 and Ymin performed by the comparator 141b are input to the flip-flops 151(1), 141(3), 151(5) and 151(7), respectively.

An operation of the graphics element selecting unit 80B will be described.

Figure 13:
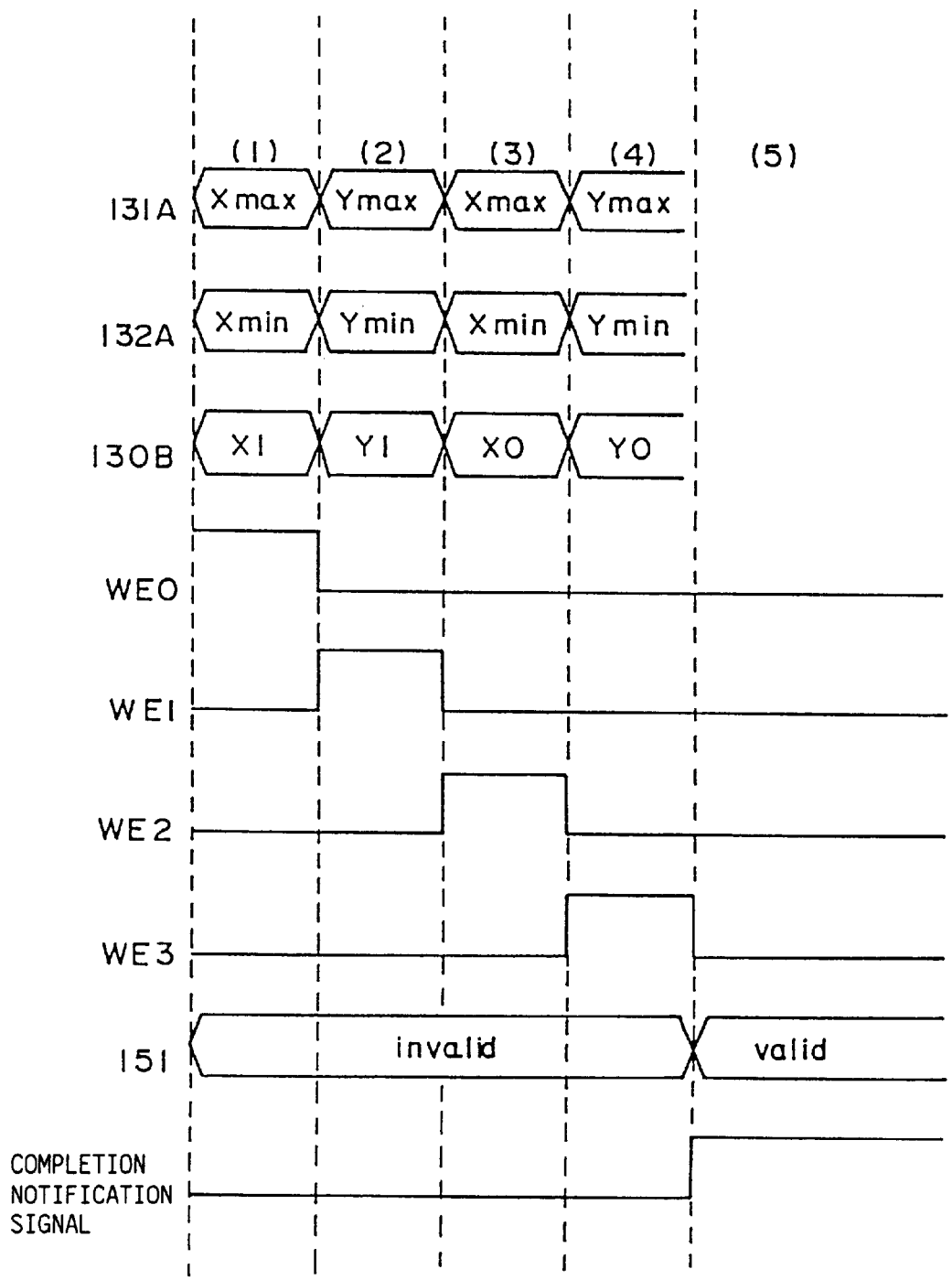
FIG. 13 is a timing chart of an operation of the graphics element selecting unit shown in FIG. 11.

FIG. 13 is a timing chart of operations of the selectors 131A, 132A and 130B, the write enable signals WE0. WE1, WE2 and WE3, and an operation of the comparison result register 151. By referring to FIGS. 11–13, a description will be given of an operation of the graphics element selecting unit 80B related to the line AB shown in FIG. 9.

In cycle (1) shown in FIG. 13, the selector 131A obtains the data value Xmax from the drawn field register 110, and applies it to the comparator 141a. The selector 132A obtains the data value Xmin from the drawn field register 112, and applies it to the comparator 141b. At this time, the selector 130B obtains the data value X1 from the end point coordinate register 122, and applies it to the comparators 141a and 141b. Then, the comparator 141a compares the data values Xmax and X1 with each other, and the comparator 141b compares the data values Xmin and X1 with each other. As shown in FIG. 9, the end point B is located in the non-drawn field 104 and thus X1>Xmax. Hence, data "1" and "0" are supplied to the comparison result register 151 from the comparators 141a and 141b.

At this time, as shown in FIG. 13, the write enable signal WE0 applied to the flip-flops 151(0) and 151(1) of the comparison result register 151 is at the high level. Hence, data "1" is written into the flip-flop 151(0), and data "0" is written into the flip-flop 151(1).

Subsequently, in cycle (2), the selector 131A obtains the data value Ymax from the drawn field register 111, and applies it to the comparator 141a. The selector 132A obtains the data value Ymin from the drawn field register 113, and applies it to the comparator 142b. At this time, the selector 130B obtains the data value Y1 from the end point coordinate register 123, and applies it to the comparators 141a and 141b. The comparator 141a compares the data values Ymax and Y1 with each other, and the comparator 141b compares the data values Ymin and Y1 with each other. As shown in FIG. 9, the end point B is located in the non-drawn field 104 and Y1>Ymax. Hence, data "1" and "0" are supplied to the comparison result register 151 from the comparators 141a and 141b.

At this time, as shown in FIG. 13, the write enable signal WE1 input to the flip-flops 151(2) and 151839 of the comparison result register 151 is at the high level. Hence, data "1" is written into the flip-flop 151(2) and data "0" is written into the flip-flop 151(3).

In cycles (3) and (4), the comparing operations on Xmax and X0, Xmin and X0, Ymax and Y0 and Ymin and Y0 are carried out. Then, the flip-flops 1151(7), 151(6), . . . , and 151(0) are supplied with data 0, 1, 1, 0, 0, 1, 0 and 1, respectively. The four left-side bits (0110) of the above bit train and the four right-side bits (0101) thereof respectively form the field codes of the end points A and B.

Since writing of data into the comparison result register 151 is in progress in cycles (1)–(4), outputting of data to the decoder 160 from the comparison result register 151 is not performed under the control of the control circuit 171 (invalid state).

In cycle (5) in which all the bits of the comparison result register 151 have been supplied with data, the completion notification signal indicative of the above is sent to the comparison result register 151 from the control circuit 171. At this time, the comparison result register 151 is in the valid state in which the eight-bit data recorded in cycles (1)–(4) can be sent to the decoder 160, which receives them via the input terminals a0–a7.

In the decoder 160 shown in FIG. 8, the input terminals a7, a6, a5 and a4 are respectively supplied with the MSB, the second digit therefrom, the third digit therefrom and the LSB of the field code (0110) of the end point A. The input terminals a3, a2, a1 and a0 are supplied with the MSB, the second digit therefrom, the third digit therefrom and the LSB of the field code (0101) of the end point B. In this case, data "1" is output via the output terminal b3. Hence, it is determined that the line AB is not needed to be drawn.

As described above, the graphics element selecting unit 80B has one selector more than the unit 80A and has one comparator more than the unit 80A. However, the graphics element selecting unit 80B can perform two comparing operations simultaneously in one cycle, so that the decision as to whether the graphics element of interest should be drawn can be made at a high speed, as compared to the first embodiment of the present invention.

If a line DB having an end point D (X2, Y2) is subjected to the determination operation in the graphics element selecting units 80A and 80B after the line AB is subjected to the determination operation, only the data stored in the end point registers 120 and 121 are replaced by X2 and Y2, respectively.

In the above case, the comparing operations on X2 and Xmax, X2 and Xmin, Y2 and Ymax, and Y2 and Ymin are carried out, and the field code of the end point D is determined based on the result of the comparing operations. On the other hand, the operation for determining the field code of the end point B is not performed, and the field code thereof which has been determined is used. Hence, each of the graphics element selecting units 80A and 80B can determine whether the line DB should be drawn at a higher speed than that for the line AB.

If the end points A and B are respectively located in the non-drawn fields 107 and 109 shown in FIG. 9, the most significant bits MSB of the field codes of the end points A and B are both "1". If the end points A and B are respectively located in the non-drawn fields 106 and 109, the least significant bits LSB of the field codes of the end points A and B are both "1". It can be seen from the above that the line AB can be determined as being located out of the drawn field 101 if the same digits of the field codes of both ends of the line AB are both "1".

Thus, if the same digits of the field codes of both ends A and B are both "1", the control circuits 170 and 171 of the graphics element selecting units 80A and 80B stops performing the comparing operation on the remaining coordinate data, and causes the decoder 160 to issue a decision signal indicating that the graphics element of interest should not be drawn. As described above, if the graphics element of interest can be determined as being located out of the drawn field 101 before the comparing operations on the coordinate values of all the combinations are completed, the comparing operations on the coordinate values of the remaining combinations are not carried out but the above-mentioned decision signal is issued. Hence, it is possible to reduce the time necessary to determine whether the graphics element of interest should be drawn.

Figure 14:
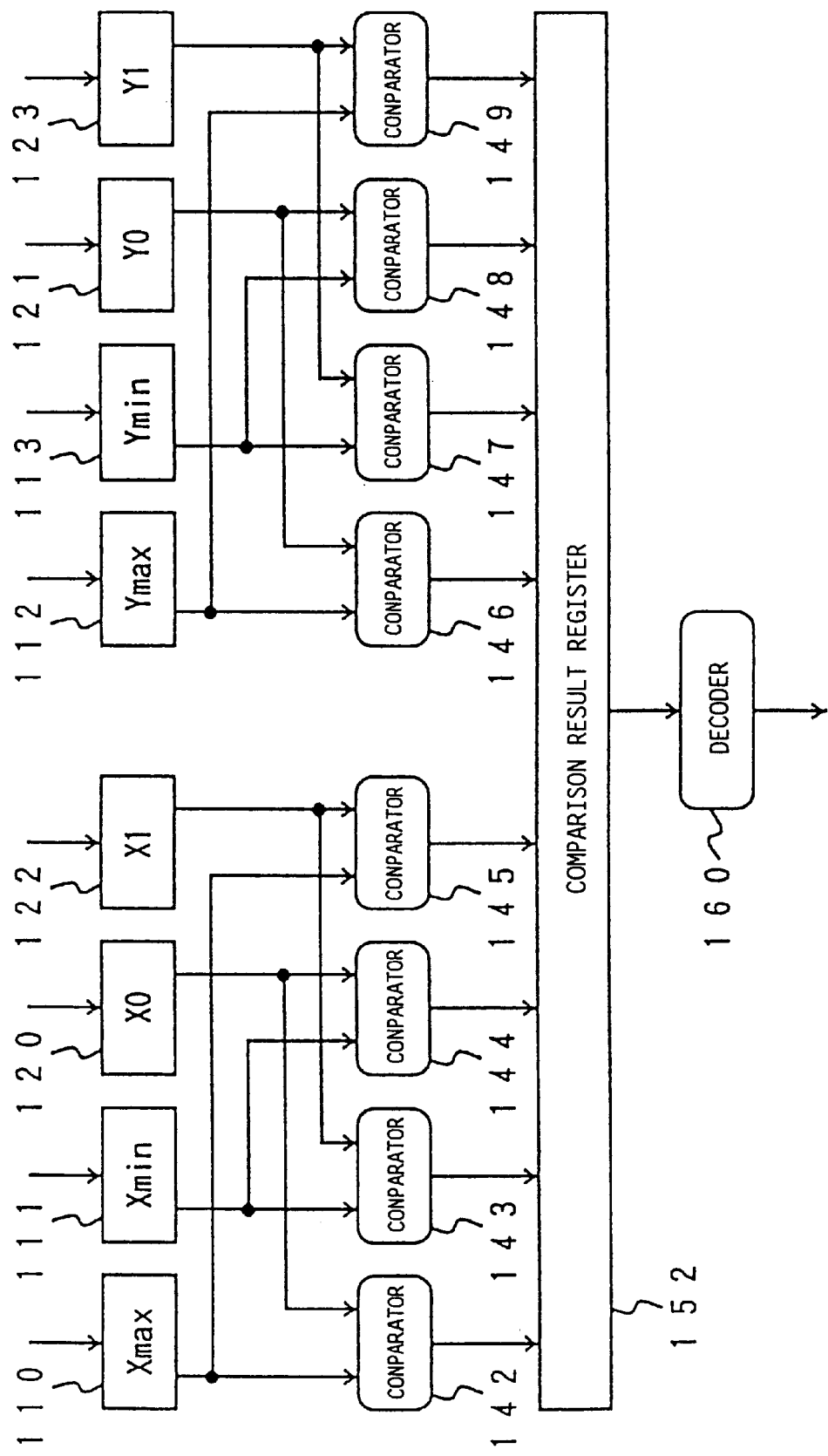
FIG. 14 is a block diagram of a graphics element selecting unit according to a third embodiment of the present invention.

FIG. 14 is a block diagram of an overall structure of a graphics element selecting unit 80C according to a third embodiment of the present invention. In FIG. 14, parts that are the same as those shown in the previously described figures are given the same reference numbers. As shown in FIG. 14, the graphics element selecting unit 80C includes the drawn field registers 110–113, the end point coordinate registers 120–123, comparators 142 149, a comparison result register 152, a decoder 160 and a control circuit (not shown for the sake of simplicity). This control circuit is the same as the control circuit 170 used in the first embodiment of the present invention shown in FIG. 5.

As shown in FIG. 14, the comparators 142–149 are respectively supplied with the data values Xmax and X0, Xmin and X1, Xmin and X0, Xmax and X1, Ymax and Y0, Ymin and Y1, Ymin and Y0, and Ymax and Y1. The comparators 142–149 have the same function as that of the comparator 140 used in the first embodiment of the present invention. That is, each of the comparators 142–149 compares two pieces of input data with each other, and outputs "1" or "0" to the comparator result register 152 on the basis of the comparison result.

Figure 15:
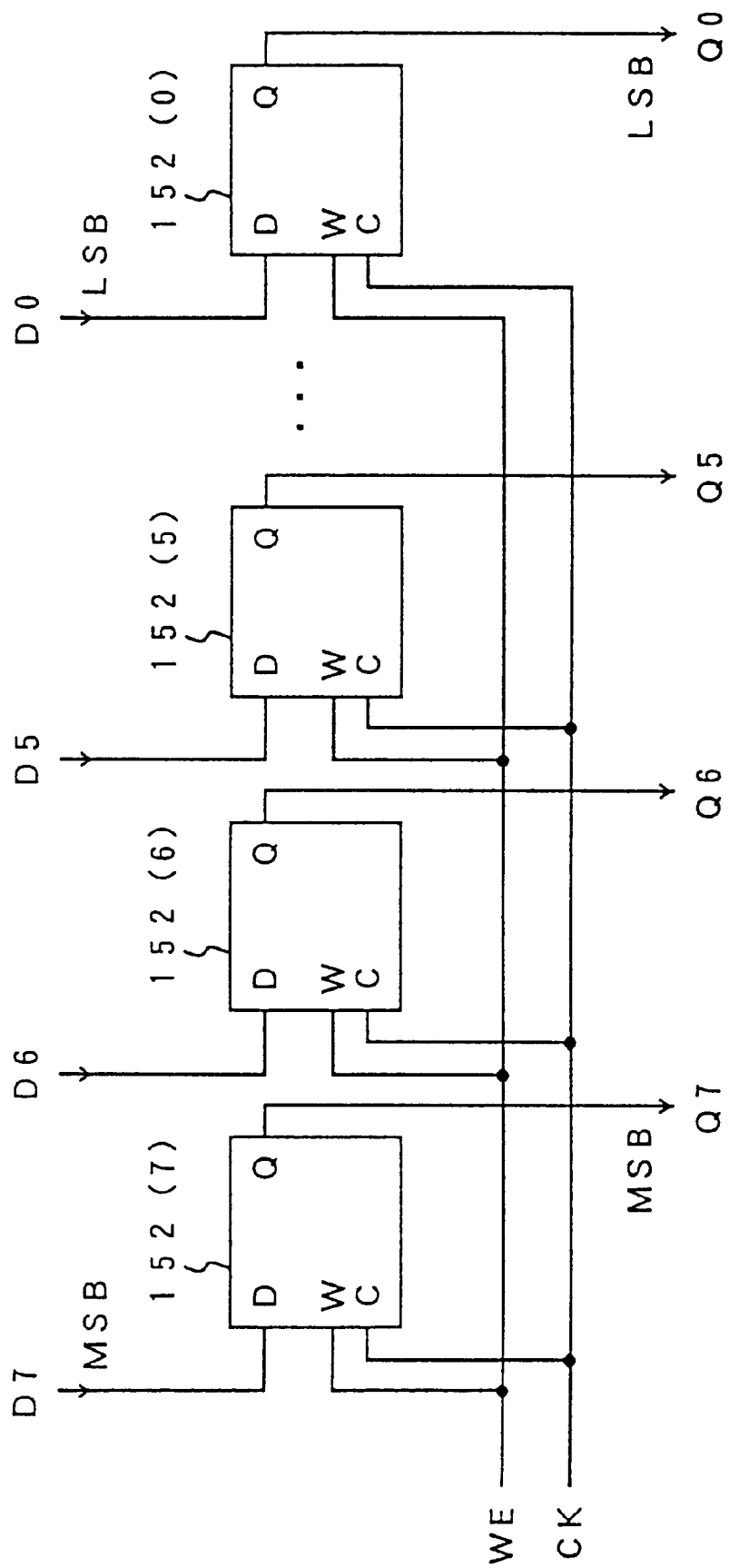
FIG. 15 is a block diagram of a comparison result register shown in FIG. 14.

FIG. 15 is a block diagram of a structure of the comparison result register 152. The comparison result register 152 is an eight-bit register as in the case of the comparison result register 150 used in the graphics element selecting unit 80A, and includes eight flip-flops 152(0), 152(1), . . . , and 152(7). Each of the flip-flops 152(0)–152(7) has a write enable signal input terminal W, a clock signal input terminal C, a data input terminal D and a data output terminal Q. Each of the flip-flops 152(0)–152(7) of the comparison result register 152 differs from that of the comparison result register 150 in that the same write enable signal WE is applied to the flip-flops 152(0)–152(7).

The comparison results of the comparators 142–149 are respectively input to the flip-flops 152(4), 152(1), 152(5), 152(0), 152(6), 152(3), 152(7) and 152(2).

In the graphics element selecting unit 80C, the pieces of data each indicating "0" or "1" are simultaneously supplied to the comparison result register 152 from the comparators 142–149 in one cycle, and the field codes of the end points A and B are determined. The data of the flip-flops 152(0) –152(7) are input to the decoder 160, which outputs the decoded output obtained by determining whether the line AB should be drawn. Hence, the graphics element selecting unit 80C can perform the determination operation on the graphics element of interest at a higher speed.

Figure 16:
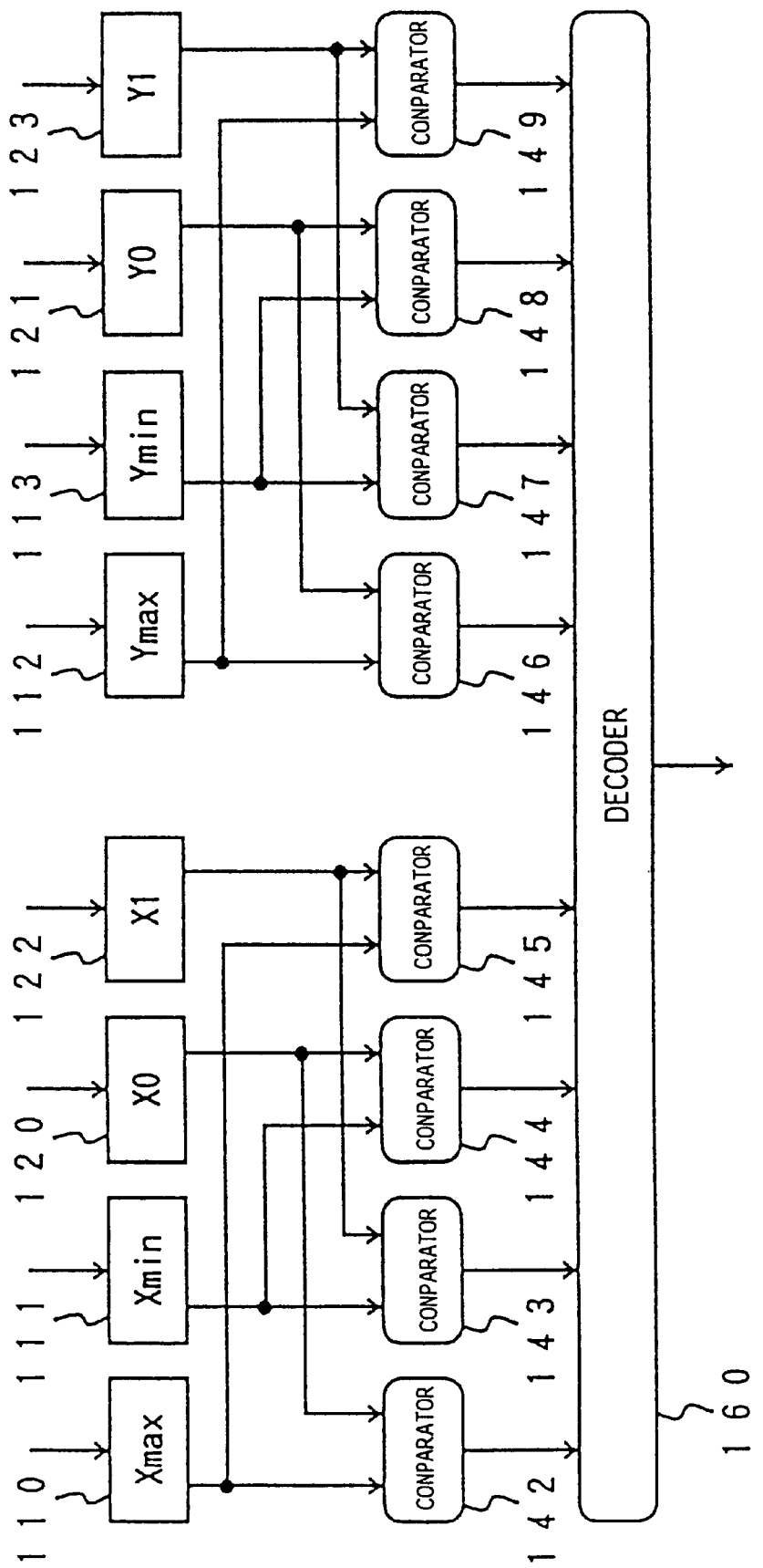
FIG. 16 is a block diagram of a graphics element selecting unit according to a fourth embodiment of the present invention.

FIG. 16 is a block diagram of an overall structure of a graphics element selecting unit 80D according to a fourth embodiment of the present invention. In FIG. 16, parts that are the same as those shown in the previously described figures are given the same reference numbers. The graphics element selecting unit 80D includes the drawn field registers 110–113, the end point coordinate registers 120–123, the comparators 142–149, the decoder 160 and a control circuit (not shown for the sake of simplicity). This control circuit is the same as the control circuit 170 shown in FIG. 5.

The graphics element selecting unit 80D can be configured by removing the comparison result register 152 from the graphics element selecting unit 80C. The other parts of the unit 80D are the same as those of the unit 80C.

The comparison results of the comparators 142–149 are respectively input to the input terminals a4, a1, a5, a0, a6, a3, a7 and a2 of the decoder 160 shown in FIG. 8.

In the graphics element selecting unit 80D, the pieces of data each indicating "0" or "1" are simultaneously supplied to the decoder 160 from the comparators 142–149 in one cycle, and the process of determining whether the line AB should be drawn is immediately carried out. Hence, the graphics element selecting unit 80C can perform the determination operation on the graphics element of interest at a much higher speed.

Figure 17:
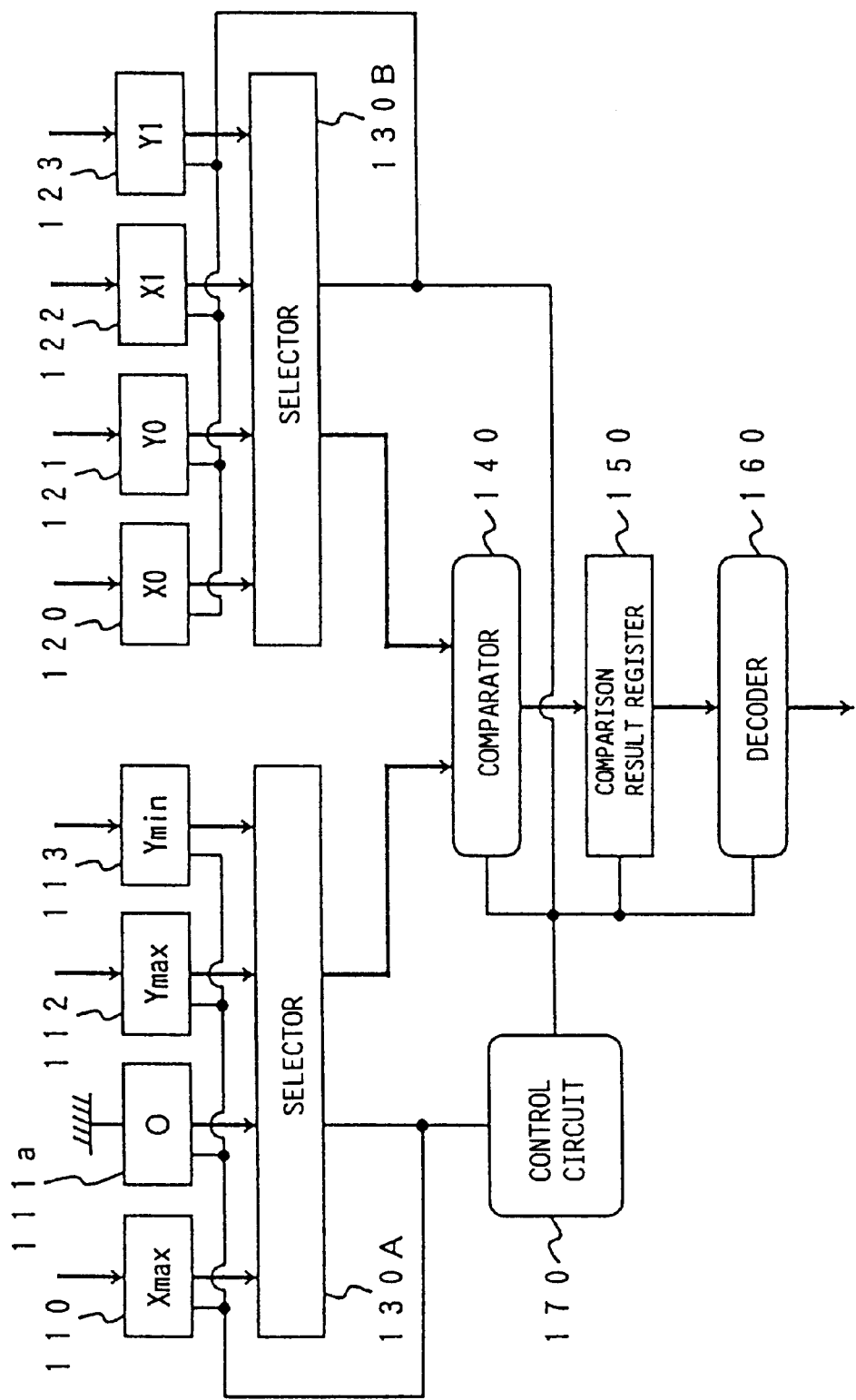
FIG. 17 is a block diagram of a graphics element selecting unit according to a fifth embodiment of the present invention.

FIG. 17 is a block diagram of an overall structure of a graphics element selecting unit 80E according to a fifth embodiment of the present invention. The unit 80E is equipped with a constant-value generator 111a, which is replaced by the drawn field register 111 used in the unit 80A. The constant-value generator 111a generates a constant value of "0". The other parts of the unit 80E are the same as those of the unit 80A.

Figure 18:
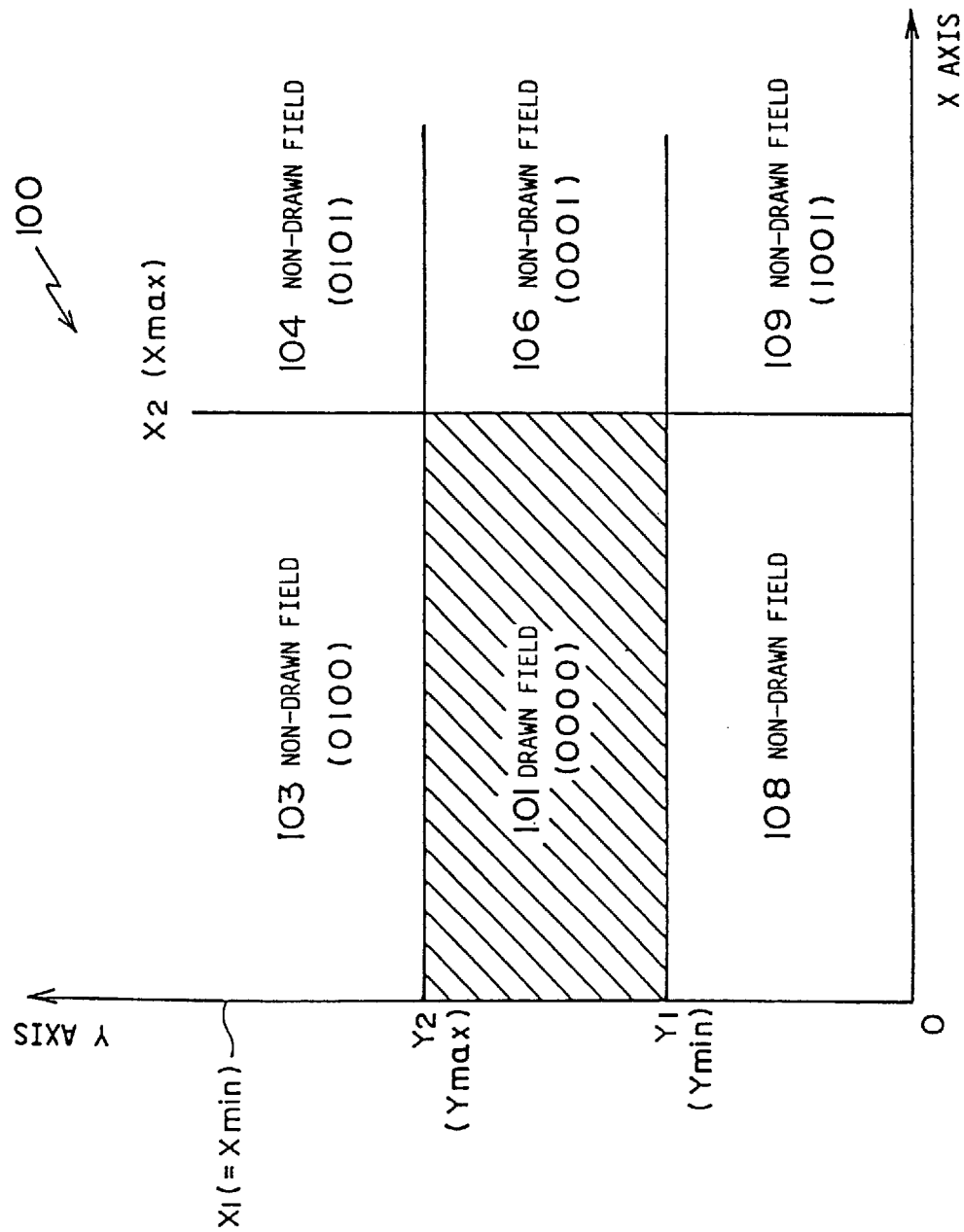
FIG. 18 shows a plane in which a straight line X1 indicative of the minimum coordinate value of a drawn field is zero.

FIG. 18 shows that the straight line X1 indicative of the minimum value Xmin of the drawn field 101 on the plane 100 is equal to 0. When the drawn field 101 has a range as shown in FIG. 18, the value of Xmin is always "0". The graphics element selecting unit 80E shown in FIG. 17 is used when the drawn field 101 as shown in FIG. 18 is defined. In this case, the output of the drawn field resistor associated with the minimum value Xmin is always "0". Hence, the output of the constant-value generator 111a is always "0".

The constant-value generator 111a has a configuration simpler than that of the drawn field register 111 from which various values can be read, and thus have a lower failure rate. Hence, when the drawn field 101 is defined as shown in FIG. 18, the graphics element selecting unit 80E is used, so that the reliability of the graphics processing apparatus 1 can be improved.

The constant-value generator 111a is not limited to the drawn field register 111 and can be substituted for any of the other registers. The constant-value generator 111a is not limited to the graphics element selecting unit 80E but can be applied to any of the graphical element selecting units 80B, 80C and 80D. The output of the constant-value generator 111a is not limited to "0". For example, the constant-value generator 111a that generates "1" can be used in accordance with the range of the drawn field 101. By connecting a given terminal of the constant-value generator 111a to the ground or a power supply, it is possible to fix the output value thereof to "0" or "1".

Figure 19:
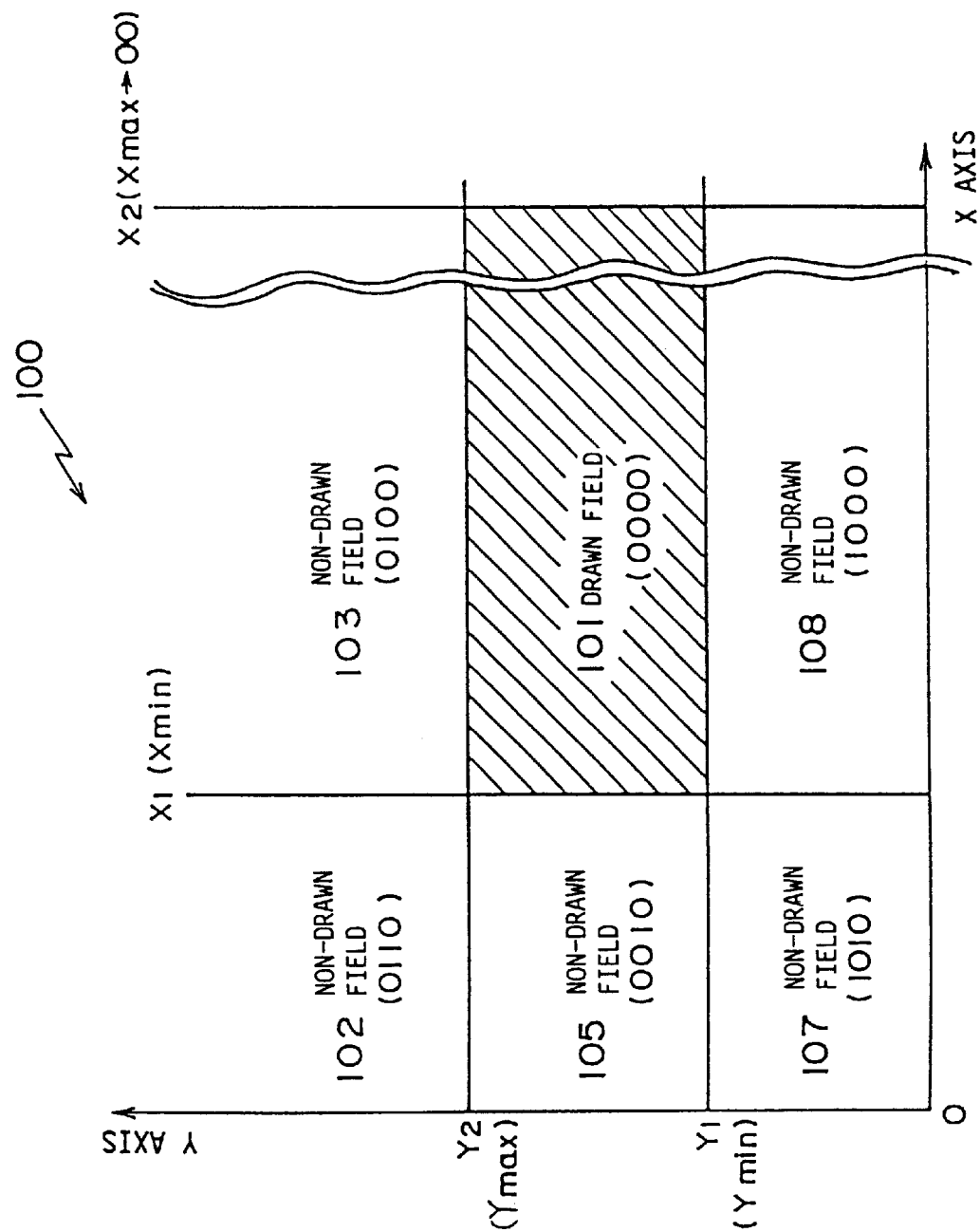
FIG. 19 shows a plane in which the minimum coordinate value of a drawn field is infinite.

FIG. 19 shows that the maximum value Xmax of the drawn field 101 is infinite on the plane 100. In this case, X0<Xmax and X1<Xmax. Hence, the comparator 140 is not needed to perform the comparing operation on the data X0 and X1. Hence, if the graphics element selecting unit 80E is used to determine whether a graphics element of interest should be drawn in the drawn field 101 in which Xmax is infinite as shown in FIG. 19, the processes carried out in cycles (1) and (5) shown in FIG. 10 can be omitted. Hence, it is possible to reduce the time necessary for determining whether the graphics element of interest should be drawn.

Additionally, some of the comparing operations of the comparator 140 can be omitted in a case where one or a plurality of the other drawn field data Xmax, Xmin, Ymax and Ymin are infinite.

Figure 20:
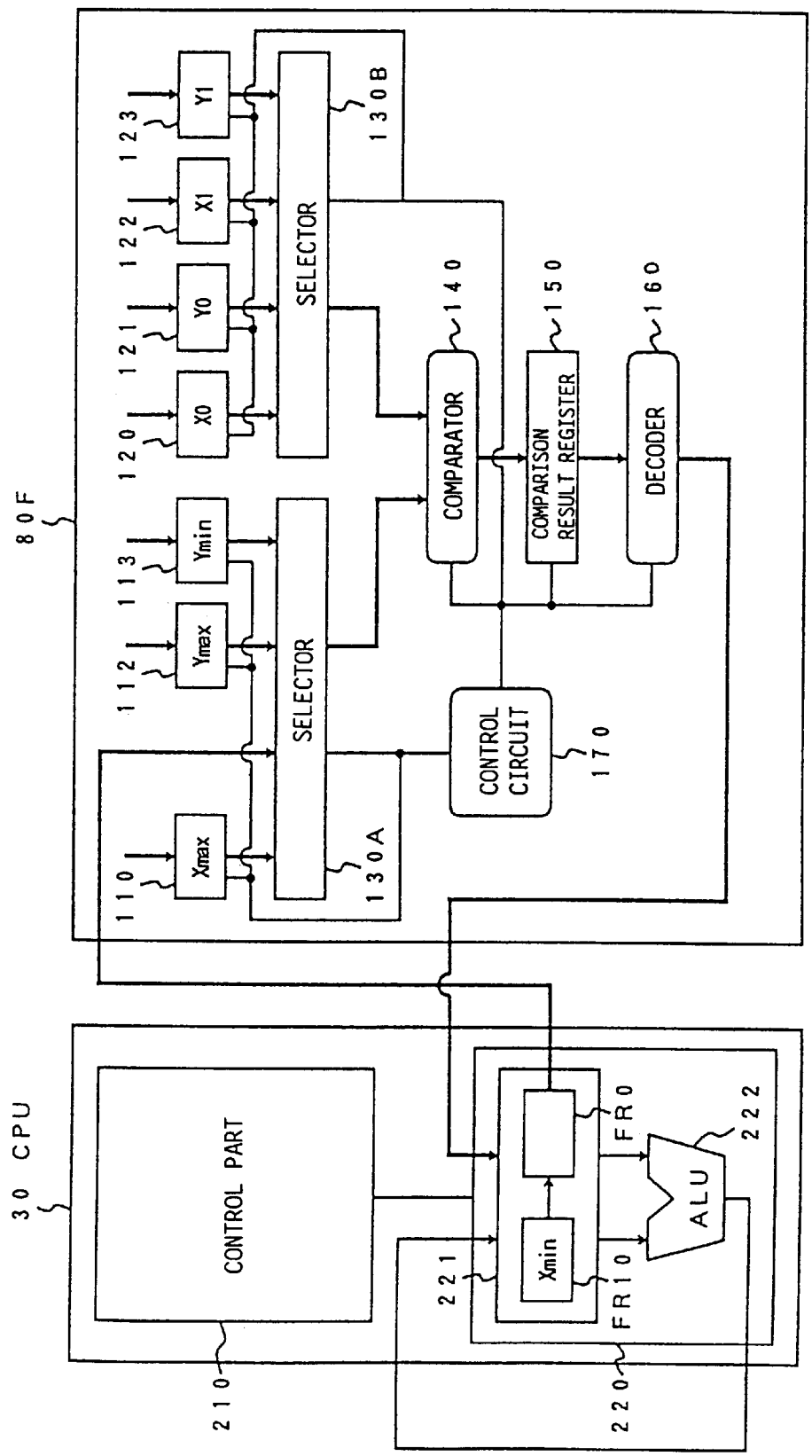
FIG. 20 is a block diagram of an arrangement of a graphics element selecting unit and a CPU.

FIG. 20 is a block diagram of a graphics element selecting unit 80F according to a sixth embodiment of the present invention and the CPU 30. The graphics element selecting unit 80F has the same structure as the graphics element selecting unit 80A except for the drawn field register 111.

A register FR0 in the CPU 30 of the graphics element selecting unit 80F functions as the drawn field register 111. Further, the output value of the decoder 160 is input to a register part 221 in the CPU 30.

As shown in FIG. 20, the CPU 30 is generally made up of a control part 210 and an operation part 220. The control part 210 sends a control signal to the operation part 220 in accordance with a program given thereto, and thus controls the operation part 220. The operation part 220 includes the register part 221 and an ALU (Arithmetic and Logic Unit) 222, and performs an operation and a process with regard to data stored in the register part 221.

The ALU 222 is a circuit which performs an arithmetic operation on numerical data and a logic operation on logic data in accordance with the control signal supplied from the control part 210. The register part 221 includes registers FR0 and FR10, and stores data and an operation result of the ALU 222.

Each of the registers FR0 and FR10 is formed of a flip-flop circuit having bits enough many to store any of the data values Xmax, Xmin, Ymax, Ymin, X0, Y0, X1 and Y1.

In the above structure, if the data value Xmin is stored in the register FR10, it can be transferred to the register FR0 in response to an instruction "MOV FR10, FR0". The result obtained by determining whether the graphics element of interest should be drawn is input to the register 221 in the CPU 30.

The CPU 30 shown in FIG. 20 supplies the graphics element selecting unit 80F with the data value Xmin by executing the given program and activates the unit 80F. The CPU 30 determines whether the graphics element of interest should be drawn on the basis of the process result given by the unit 80F. The CPU 30 shown in FIG. 20 implements a part of the structure of the unit 80F, which can be miniaturized. It is possible to incorporate the graphics element selecting unit 80F having the connections shown in FIG. 20 into the CPU 30.

In each of the graphics element selecting units 80B, 80C, 80D and 80E, the drawn field register 111 (register FR0) may be shared by the CPU 30. The register FR0 in the CPU 30 may be used as not only the drawn field register 111 for storing the data value Xmin but also the drawn field register 110, the end point register 120 or the like. In the graphics element selecting unit 80F, the drawn field registers and the end point registers are formed of registers built in the CPU 30.

Figure 21:
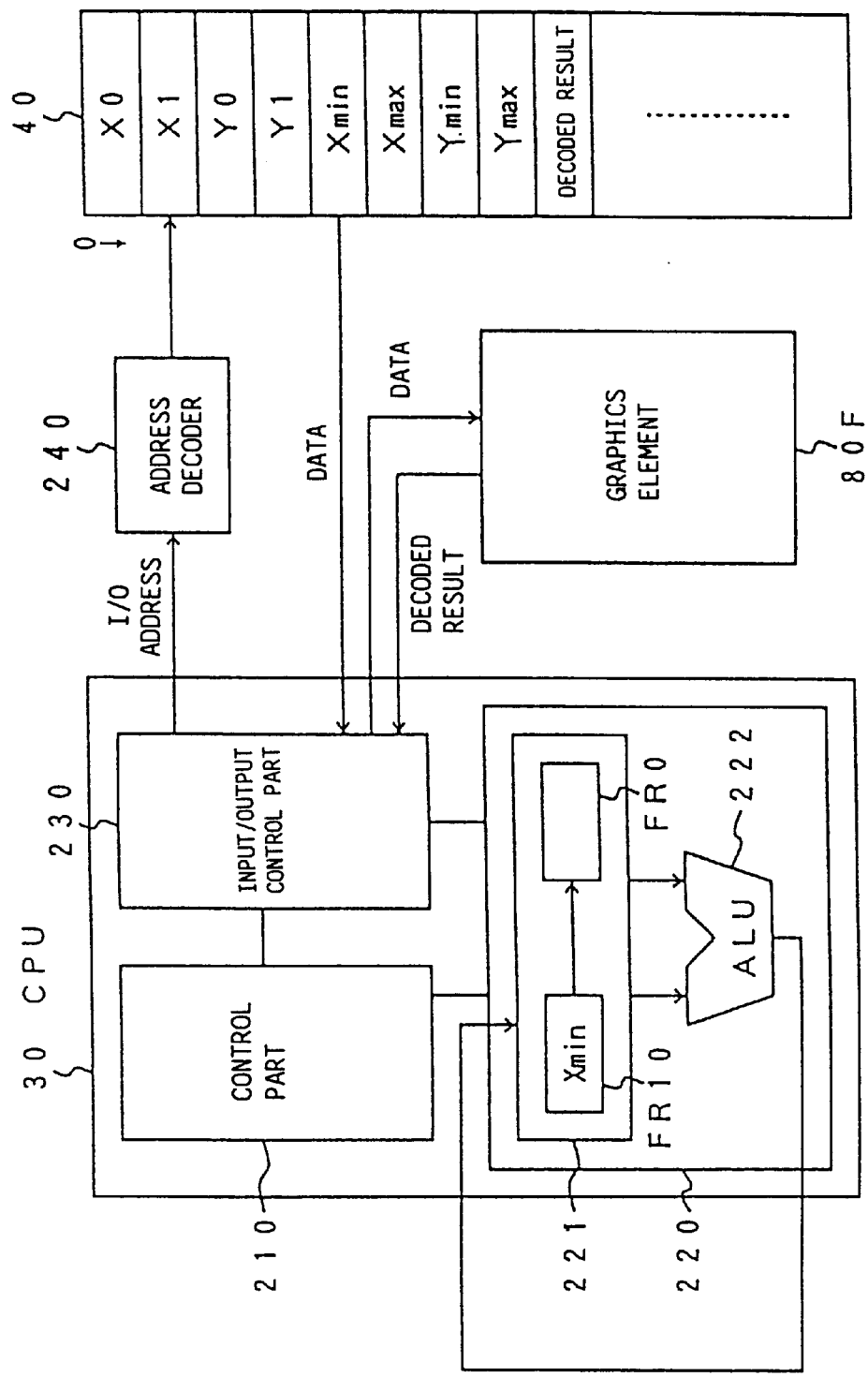
FIG. 21 is a block diagram of an arrangement in which the graphics element selecting unit shown in FIG. 20, an address unit and the memory unit shown in FIG. 4 are connected to the CPU shown in FIG. 4.

FIG. 21 is a block diagram of a structure in which the graphics element selecting unit 80F, an address decoder 240 and the memory unit 40 are connected to the CPU 30. As shown in FIG. 21, the memory 40 is arranged so as to have areas for storing the data values X0, X1, Y0, Y1, Xmin, Xman, Ymin and Ymax and areas for storing the results of decoding.

When the CPU 30 executes an instruction which causes the data value Xmin to be written into the register FR10 of the register part 221, an input/output control part 230 of the CPU 30 issues an address of the memory area in which the data value Xmin is stored. The data value Xmin stored in the memory area indicated by the address is applied to the register part 221 via the input/output control part 230, and is written into the register FR10 of the register part 221.

Then, as has been described with reference to FIG. 20, the CPU 30 executes the instruction "MOV FR10, FR0", the data value Xmin is transferred to the register FR0 from the register FR10. The register FR0 functions as the drawn field register 111 of the graphics element selecting unit 80F. The result of the determination by the unit 80F is applied to the CPU 30 via the input/output control part 230.

Thus, execution of the instruction by the CPU 30 causes the data value Xmin stored in the memory unit 40 to be applied to the graphics element selecting unit 80F, which determines whether the graphics element of interest should be drawn. The CPU 30 obtains the result of the above determination. The structure shown in FIG. 21 allows the user to write the data value Xmin or another data into the memory 40 and select a graphics element to be drawn.

Figure 22:
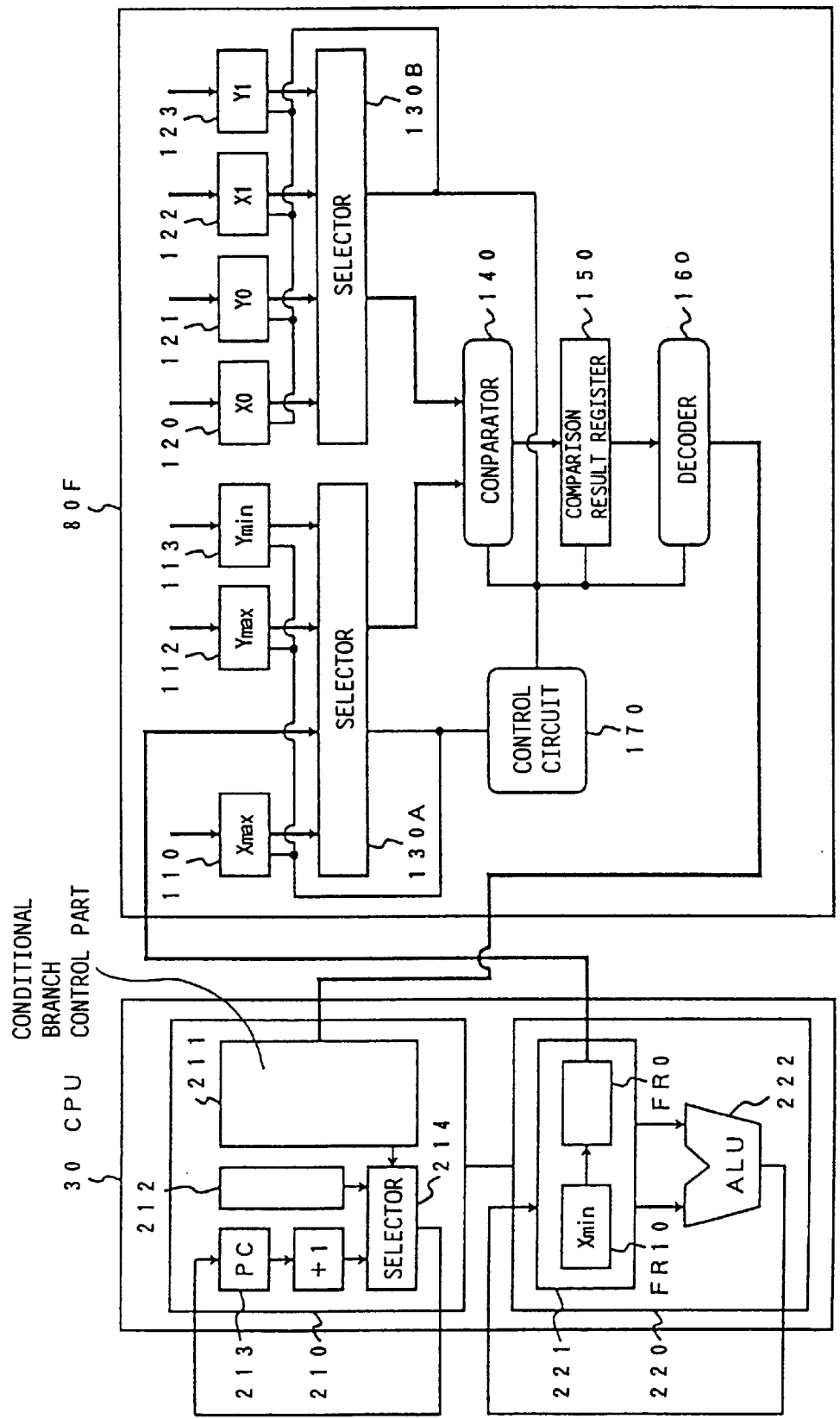
FIG. 22 is a block diagram of an arrangement in which a result of decoding output by the graphics element selecting unit is input to a conditional branch control part of the CPU.

FIG. 22 is a block diagram of an arrangement in which the graphics element selecting unit 80F and the CPU 30 are connected so that the determination result by the unit 80F is input to a conditional branch control part 211 provided in the CPU 30.

As shown in FIG. 22, the control part 210 of the CPU 30 includes the conditional branch control part 211, a branch address part 212, a program counter (PC) 213, and a selector 214. The conditional branch control part 211 issues a conditional branch instruction based on the determination result supplied from the graphics element selecting unit 80F. More particularly, the conditional branch control part 211 receives the determination result and sends a selection signal to the selector 214. In response to the selection signal, the selector 214 selects a program counter value by incrementing the counter value of the program counter 213 by +1 or a given address stored in the branch address part 212. Then, one of the selecting process for the next figure element, the drawing process for the figure element of interest and the clipping process.

With the above-mentioned structure, when the determination result by the graphics element selecting unit 80F is input to the CPU 30, the conditional branch is made based on the determination result, and one of the selecting process for the next figure element, the drawing process for the figure element of interest and the clipping process is immediately performed.

Figure 23:
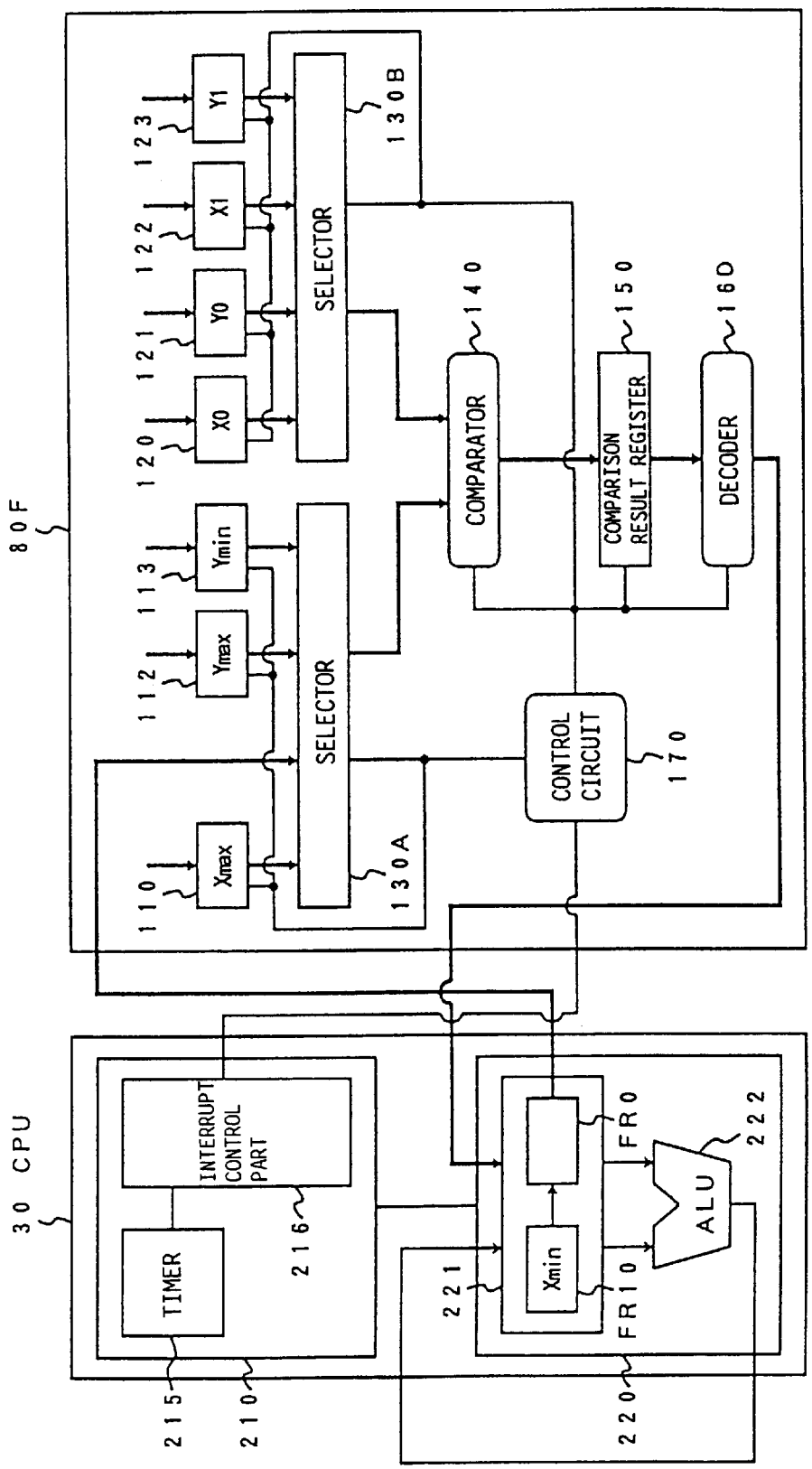
FIG. 23 is a block diagram of an arrangement in which a control circuit of the graphics element selecting unit is connected to an interrupt control part of the CPU.

FIG. 23 shows an arrangement in which the control circuit 170 of the graphics element selecting unit 80F is connected to an interrupt control part 216 provided in the CPU 30. As shown in FIG. 23, the control part 210 of the CPU 30 has the interrupt control part 216 and a timer 215.

The control part 170 can control the operation of the CPU 30 by an interrupt signal (not shown). For example, the control circuit 170 sends the interrupt signal to the CPU 30 when the result obtained by determining whether the graphics element of concern should be drawn. Then, the CPU 30 is notified of the determination result before the CPU 30 completely executes all the program steps. In this case, the remaining program steps that are no longer needed are omitted, and the CPU 30 quickly moves to one of the selecting process for the next figure element, the drawing process for the figure element of interest and the clipping process.

The interrupt control part 216 is connected to the timer 215, which can interrupt the current sequence of instructions of the CPU 30. It is also possible to interrupt the current sequence of the CPU 30 by an interrupt signal from a resource other than the timer 215.

Figure 24:
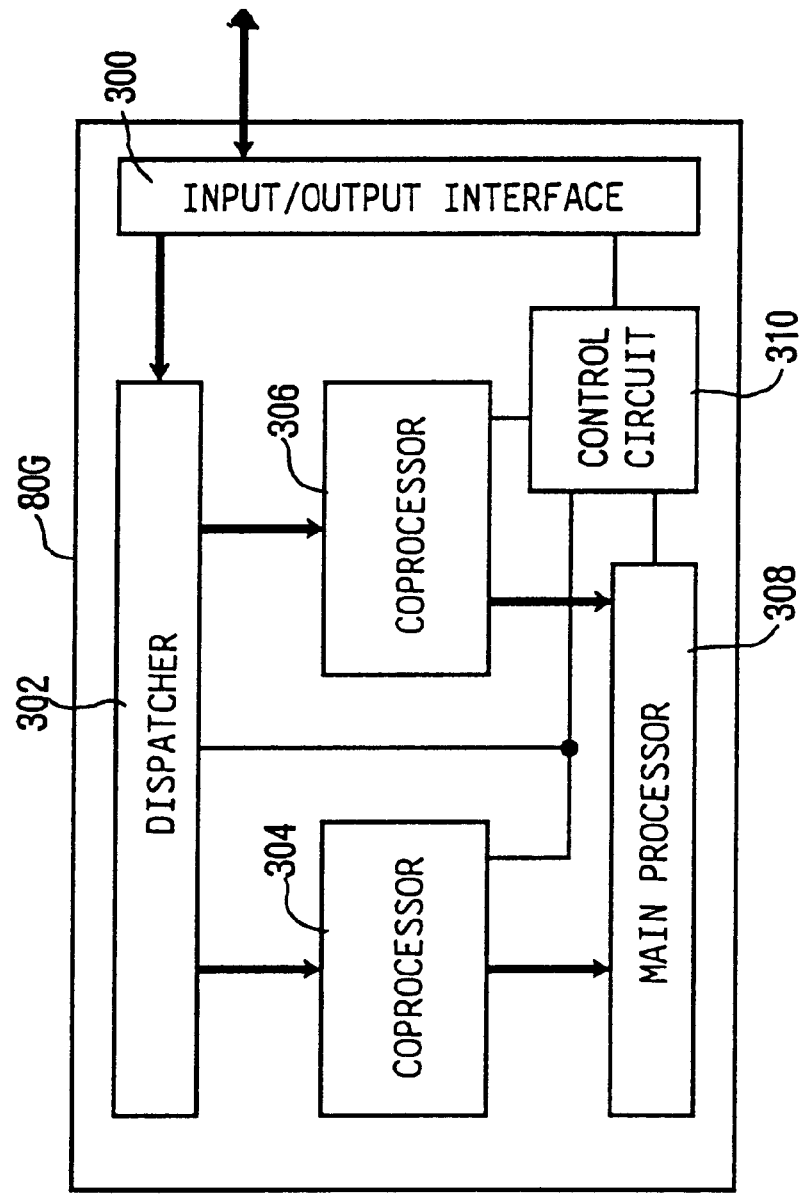
FIG. 24 is a block diagram of a graphics element selecting unit according to a seventh embodiment of the present invention.

FIG. 24 is a block diagram of a graphics element selecting unit 80G according to a seventh embodiment of the present invention. As shown in FIG. 24, the graphics element selecting unit 80G includes an input/output interface 300, a dispatcher 302, coprocessors 304 and 306, a main processor 308 and a control circuit 310.

The input/output interface 300 handles a transfer of signals between the unit 80G and an external device. The dispatcher 302 applies the coordinate data externally supplied via the input/output interface 300 to the coprocessors 304 and 306. The coprocessor 304 receives, from the dispatcher 302, the data values Xmax, Xmin of the drawn field 101 shown in FIG. 9 and the data values X0 and X1 related to the line AB, and performs a process which will be described later. The coprocessor 306 receives, from the dispatcher 302, the data values Ymax and Ymin of the drawn field 101 and the data values Y0 and Y1 related to the line AB, and performs a process which will be described later. The main processor 308 determines, based on the results of data processing by the coprocessors 304 and 306, whether the graphics element of interest, namely, the line AB should be drawn in the drawn field 101. The control circuit 310 controls the operations of the input/output interface 300, the dispatcher 302, the coprocessors 304 and 306, and the main processor 308.

Figure 25:
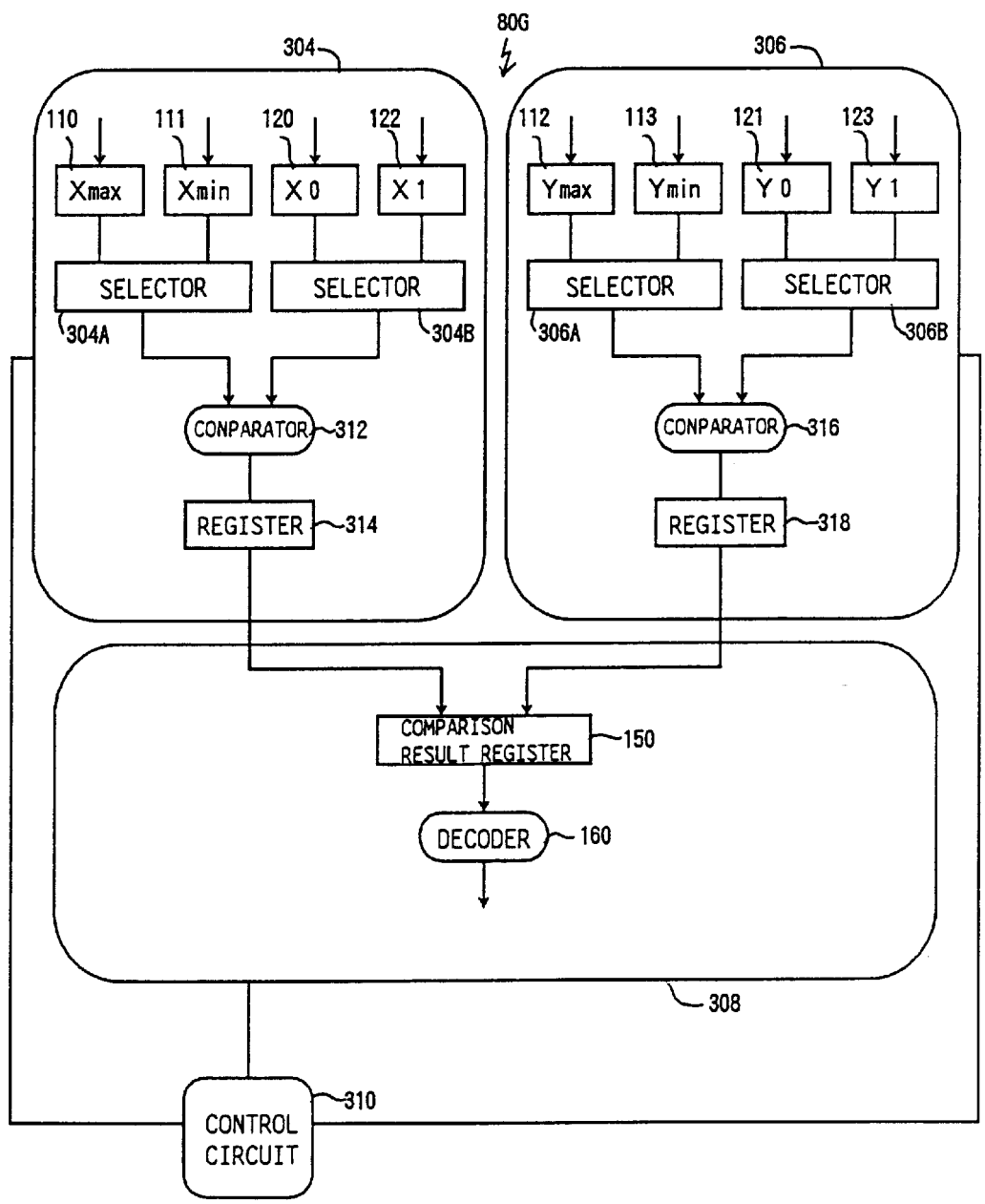
FIG. 25 is a block diagram showing the graphics element selecting unit shown in FIG. 24 in detail.

FIG. 25 is a block diagram of structures of the coprocessors 304 and 306 and the main processor 308 provided in the graphics element selecting unit 80G of the seventh embodiment of the present invention.

Referring to FIG. 25, the coprocessor 304 is made up of the drawn field registers 110 and 111, the end point registers 120 and 122, the selectors 304A and 304B, a comparator 312 and a register 314. The coprodessor 306 is made up of the drawn field registers 112 and 113, the end point registers 121 and 123, the selectors 306A and 306B, a comparator 316, and a register 318. The main processor 308 is made up of the comparison result register 150 and the decoder 160.

The drawn field registers 110–113, the end point coordinate registers 120–123, the comparison result register 150 and the decoder 160 are the same as those of the graphics element selecting unit 80A, and a description thereof will be omitted.

The selector 304A of the coprocessor 304 selects either the drawn field register 110 or 111, and supplies the data value stored in the selected register to the comparator 312. The selector 304B selects either the drawn field register 112 or 113, and supplies the data value stored in the selected register to the comparator 312.

The comparator 312 compares the data values supplied via the selectors 304A and 304B with each other, and supplies "0"or "1" to the register 314. The comparator 312 outputs "0" when X0(X1)≦Xmax or Xmin<X0(X1), and outputs "1" when X0(X1)>Xmax or X0(X1)<Xmin.

The register 314 is a four-bit register, and the four bits thereof respectively store the results of the operations on Xmin and X0, Xmax and X0, Xmin and X1, and Xmax and X1.

The selector 306A of the coprocessor 306 selects either the drawn field register 112 or 113, and supplies the data value stored in the selected register to the comparator 316. The selector 306B selects either the drawn field register 121 or 123, and supplies the data value stored in the selected register to the comparator 316.

The comparator 316 compares the data values supplied via the selectors 306A and 306B with each other, and supplies "0"or "1" to the register 318. The comparator 316 outputs "0" when Y0(Y1)≦Ymax or Ymin≦Y0(Y1), and outputs "1" when Y0(Y1)≦Ymax or Y0(Y1)<Ymin.

The register 318 is a four-bit register, and the four bits thereof store the results of the operations on Ymin and Y0, Ymax and Y0, Ymin and Y1, and Ymax and Y1.

The comparison result register 150 built in the main processor 308 is supplied with the data values stored in the registers 314 and 318 respectively provided in the coprocessors 304 and 306.

The results of the comparing operations on Xmax and X1, Xmin and X1, Xmax and X0, and Xmin and X0 performed by the comparator 312 are respectively input to the flip-flops DFF 150(0), 150(1), 150(4) and 150(5) shown in FIG. 7. The results of the comparing operations on Ymax and Y1, Ymin and Y1, Ymax and Y0, and Ymin and Y0 are respectively input to the flip-flops 150(2), 150(3), 150(6) and 150(7) shown in FIG. 7.

The data values stored in the comparison result register 150 are input to the decoder 160, which determines whether the graphics element of interest should be drawn and outputs the determination result.

The control circuit 310 controls the selectors 304A, 304B, 206A and 306B, the registers 314 and 318 and the comparison result register 150. The coprocessors 304 and 306 perform data processing in parallel fashion, as will be described later. The coprocessors 304 and 306 and the main processor 308 perform a pipeline operation.

A description will be given of an operation of the graphics element selecting unit 80G according to the seventh embodiment of the present invention.

Figure 26:
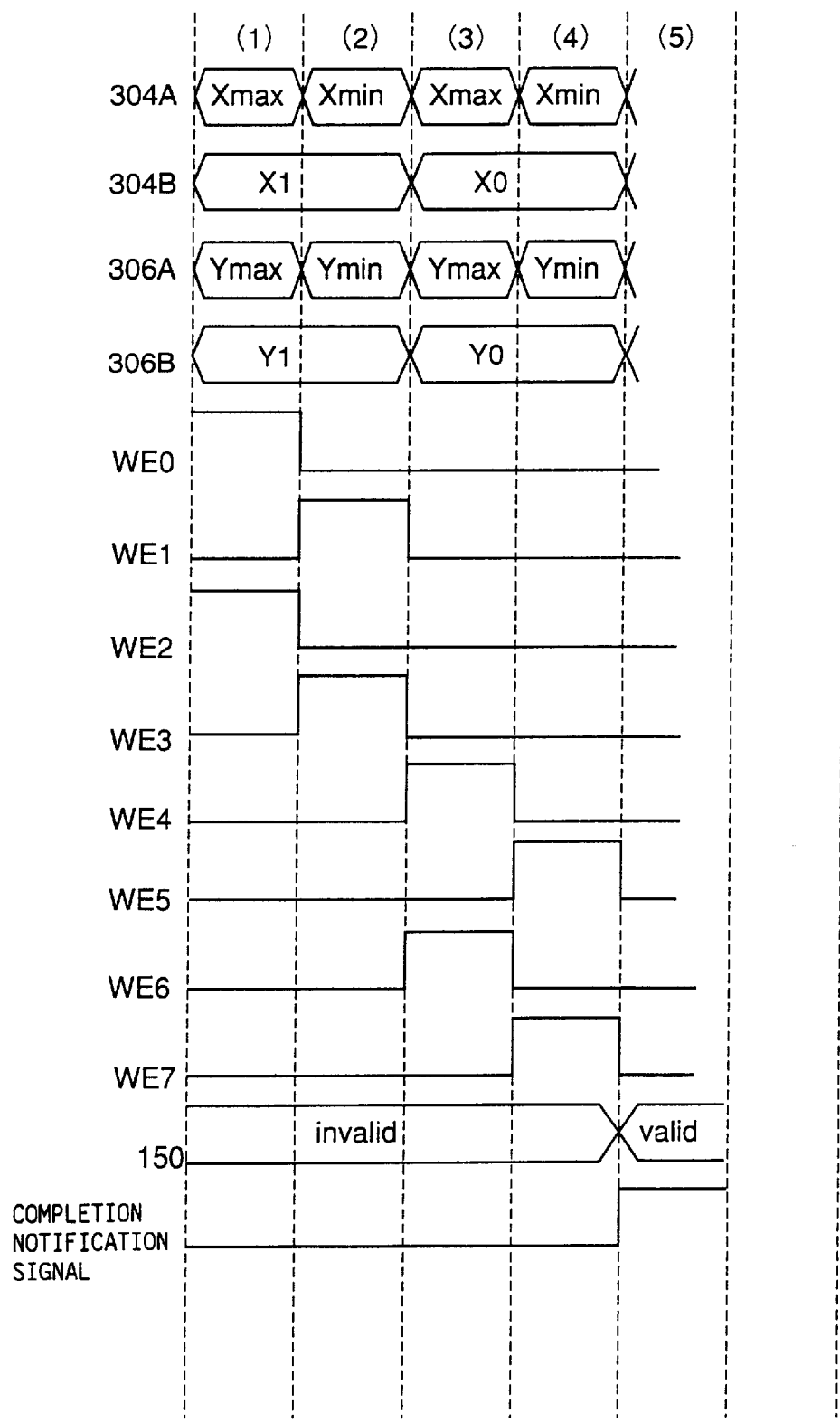
FIG. 26 is a timing chart of an operation of the graphics element selecting unit shown in FIG. 24.

FIG. 26 is a timing chart of operations of the selectors 304A, 304B, 306A and 306B, the write enable signals WE0–WE7, and an operation of the comparison result register 150. In the following description, the graphics element selecting unit 80G handles the line AB shown in FIG. 9.

In cycle (1) shown in FIG. 26, the selector 304A of the coprocessor 304 selects the data value Xmax from the drawn field register 110, and sends it to the comparator 312. The selector 304B selects the data X1 from the end point coordinate register 122, and sends it to the comparator 312. In cycle (1), the selector 306A of the coprocessor 306 selects the data value Ymax from the drawn field register 112, and sends it to the comparator 316. The selector 306B selects the data value Y1 from the end point coordinate register 123, and sends it to the comparator 316.

The comparator 312 compares the data values Xmax and X1 with each other, and the comparator 316 compares the data values Ymax and Y1 with each other. As shown in FIG. 9, the end point (X1, Y1) is located in the non-drawn field 104, and X1>Xmax and Y1>Ymax. Hence, the output signals of the comparators 312 and 316 are both "1", and are supplied to the comparison result register 150 via the registers 314 and 318, respectively. At this time, as shown in FIG. 26, the write enable signals WE0 and WE2 respectively applied to the flip-flops 150(0) and 150(2) of the comparison result register 150 are at the high level. Hence, data "1", is written into the flip-flops 150(0) and 150(2).

In subsequent cycle (2), the selector 304A of the coprocessor 304 selects the data value Xmin from the drawn field register 111, and sends it to the comparator 316. The selector 304B selects the data value X1 from the end point coordinate register 122, and sends it to the comparator 316.

The comparator 312 compares the data values Xmin and X1 with each other, and the comparator 316 compares the data values Ymin and Y1 with each other. As shown in FIG. 9, the end point B (X1, Y1) is located in the non-drawn field 104, and X1>Xmin and Y1>Ymin. Hence, the output signals of the comparators 312 and 316 are both "0", and are supplied to the comparison result register 150 via the registers 314 and 318, respectively.

At this time, as shown in FIG. 26, the write enable signals WE1 and WE3 applied to the flip-flops 150(1) and 150(3) of the comparison result register 150 are at the high level. Hence, data "0", is written into the flip-flops 150(1) and 150(3).

In cycles (3) and (4), the comparing operations on Xmax and X0, Xmin and X0, Ymax and Y0, and Ymin and Y0 are carried out, and the flip-flops 150(7), 150(6), . . . , and 150(0) are respectively supplied with data 0, 1, 1, 0, 0, 1, 0 and 1. The four left-hand bits (0110) of the above data train form the field code of the end point A, and the fourth right-hand bits thereof form the field code of the end point B.

Since writing of data into the comparison result register 150 is in progress in cycles (1)–(4), outputting of data to the decoder 160 from the comparison result register 150 is not performed under the control of the control circuit 310 (invalid state).

In cycle (5) in which all the bits of the comparison result register 150 have been supplied with data, the completion notification signal indicative of the above is sent to the comparison result register 150 from the control circuit 310. At this time, the comparison result register 150 is a valid state in which the eight-bit data recorded in cycles (1)–(4) can be sent to the decoder 160, which receives them via the input terminals a0–a7.

When input terminals a0–a7 of the decoder 160 shown in FIG. 8 are respectively supplied with data 0, 1, 1, 0, 0, 1, 0 and 1, data "1" is output via the output terminal b3 of the decoder 160. Hence, it is determined that the line AB should not be drawn.

Figure 27:
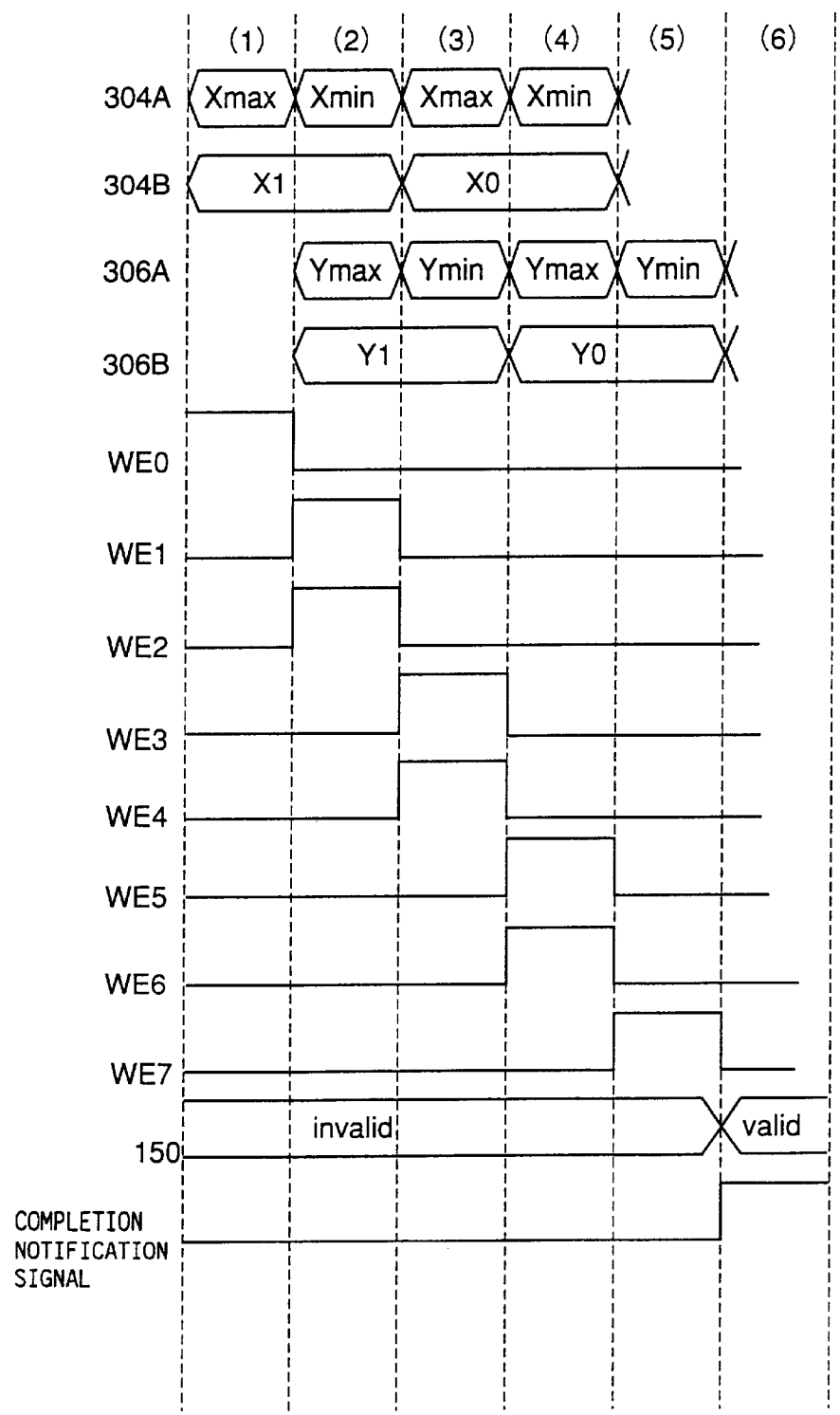
FIG. 27 is a timing chart of another operation of the graphics element selecting unit shown in FIG. 24.

As described above, the graphics element selecting unit 80G includes the coprocessor 304 handling the data process related to the X coordinate and the coprocessor 306 handling the data process related to the Y coordinate. Further, as has been described with reference to FIG. 26, the coprocessors 304 and 306 operate in parallel. Hence, it is possible to reduce the time necessary for determining whether the graphics element of interest should be drawn. The coprocessors 304 and 306 and the main processor 308 may be operated at the timings shown in FIG. 27.

Figure 28:
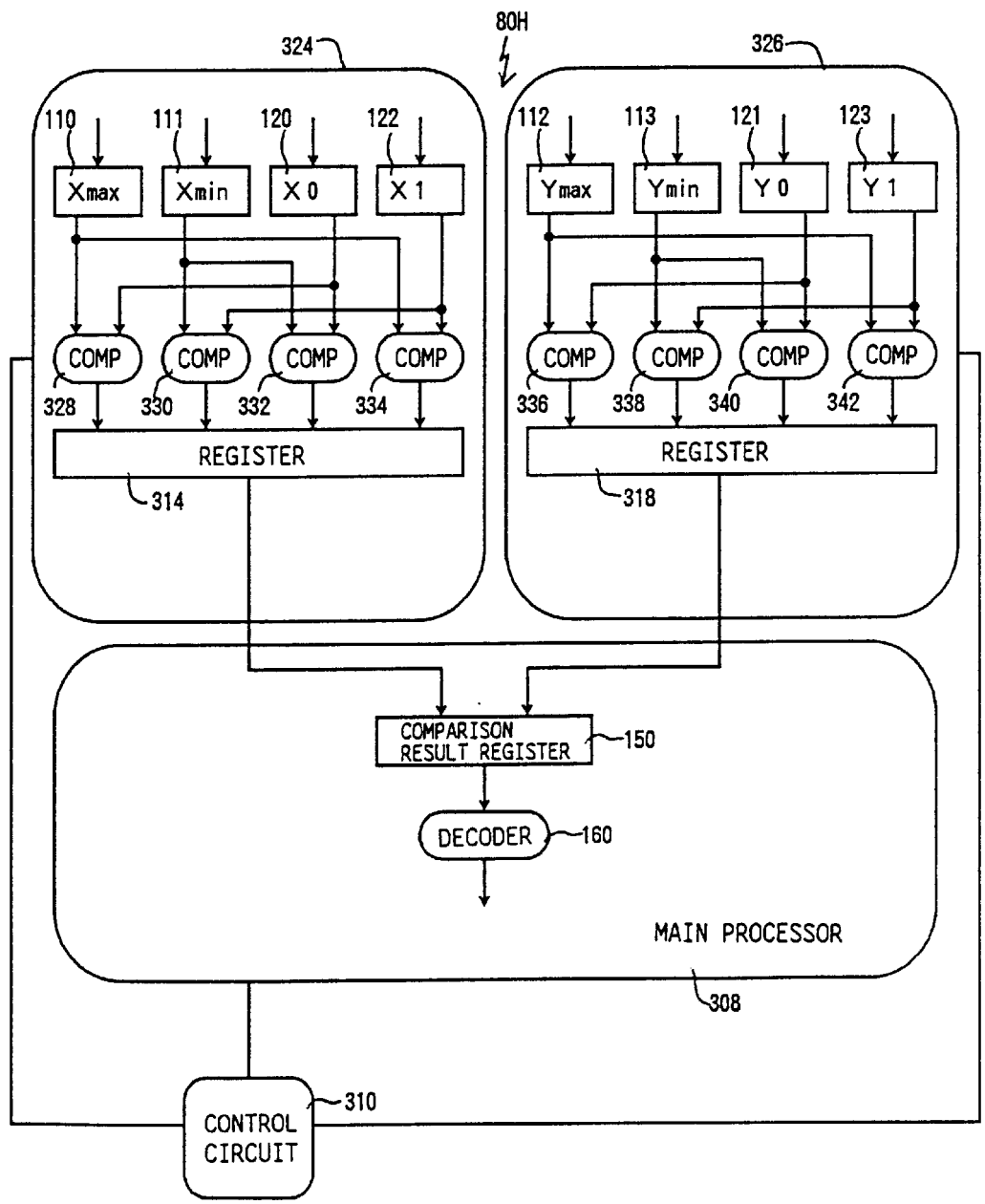
FIG. 28 is a block diagram of a graphics element selecting unit according to an eighth embodiment of the present invention.

FIG. 28 is a block diagram of a graphics element processing unit 80H according to an eighth embodiment of the present invention. The unit 80H includes coprocessors 324 and 326, the main processor 308, and the control circuit 310. The coprocessor 324 is made up of the drawn field registers 110 and 111, the end point coordinate registers 120 and 122, comparators 328, 330 and 334, and the register 314. The coprocessor 326 is made up of the drawn field registers 112 and 113, the end point coordinate registers 121 and 123, comparators 336, 338, 340 and 342, and the register 318.

The graphics element selecting unit 80H differs from the unit 80G in that the coprocessors 324 and 326 have configurations different from those of the coprocessors 304 and 306. The other parts of the unit 80H are the same as those of the unit 80G, and a description thereof will be omitted.

In the coprocessor 324, the comparators 328, 330, 332 and 334 are respectively supplied with the data values Xmax and X0, Smin and X1, Xmin and X0, and Xmax and X1. Each of the comparators 328, 330, 332 and 334 compares the respective input data values, and applies "0" or "1" to the register 314 in accordance with the respective comparison result. More particularly, each of the comparators 328, 330, 332 and 334 outputs "0" when X0(X1)≦Xmax or Xmin≦X0(X1), and outputs "1" when X0(X1)>Xmax or X0(X1)<Xmin.

In the coprocessor 326 of the unit 80H, the comparators 336, 338, 340 and 342 are respectively supplied with the data values Ymax and Y0, Ymin and Y1, Ymin and Y0, and Ymax and Y1. Each of the comparators 336, 338, 340 and 342 compares th respective input data values, and applies "0" or "1" to the register 318 in accordance with the respective comparison result. More particularly, each of the comparators 336, 338, 340 and 342 outputs "0" when Y0(Y1)≦Ymax or Ymin≦Y0(Y1), and outputs "1" when Y0(Y1)>Ymax or Y0(Y1)<Ymin.

The data values applied to the registers 314 and 318 are processed by the comparison result register 150 and the decoder 160 of the main processor 308, which thus outputs the determination result as to whether the graphics element of interest should be drawn.

As described above, the graphics element selecting unit 80H has the coprocessor 324 handling the data process related to the X coordinate and the coprocessor 326 handling the data process related to the Y coordinate, as in the case of the unit 80G. The coprocessors 324 and 326 operate in parallel. Thus, the time necessary to determine whether the graphics element of interest should be drawn can be reduced.

In the case where the drawn field 101 is defined as shown in FIG. 18, the drawn field register 111 of each of the units 80G and 80H may be the constant-value generator 111a used in the unit 80E shown in FIG. 17. Generally, the constant-value generator 111a has a configuration simpler than that of the drawn field register 111 from which various values can be read, and thus have a lower failure rate. Hence, when the drawn field 101 is defined as shown in FIG. 18, the constant-value generator 111a is used, so that down sizing of the units 80G and 80H can be achieved and the reliability of the graphics processing apparatus 1 can be improved.

When the drawn field 101 is defined as shown in FIG. 19, then X0<Xmax and X1<Xmax. In the case, the infinite value is applied to the drawn field registers 110 of the units 80G and 80H. Hence, data "0" is immediately written into the flip-flops 150(0) and 150(4). Hence, it is possible to omit the comparing operations of the comparators 312, 328 and 334 and to reduce the time it takes to determine whether the graphics element of interest should be drawn.

As in the case of the unit 80F shown in FIG. 20, the unit 80G or 80H may be connected to the CPU 30. In this case, an instruction is applied to the CPU 30, which supplies the data values related to the drawn field and the end points to the unit 80G or 80H. Some of the registers may be shared by the CPU 30, so that down sizing of the graphics processing unit 1 can be facilitated.

The conditional branch control part 211 shown in FIG. 22 may be provided in the main processor 308. In this case, the output of the decoder 160 is applied to the conditional branch control part 211. The conditional branch is defined based on the result of decoding, and the operation of the main processor 308 depends on the result of decoding.

The interrupt control part 216 shown in FIG. 23 may be provided in the main processor 308. In this case, the output of the decoder 160 is applied to the interrupt control part 216. Hence, the operation of the main processor 308 depends on the result of decoding.

The above description is directed to processing the line AB on the two-dimensional plane 100. However, the graphical elements may be polygonal or solid figures. The space on which the graphics elements are drawn may be a three-dimensional space.

The present invention is not limited to the specifically disclosed embodiments, and variations and modifications may be made without departing from the scope of the present invention.

What is claimed is:

1. A graphics processing apparatus, comprising:
a drawn field register to store coordinate values of boundaries of a drawn field;
an end point coordinate register to store coordinate values of end points of a graphical element of interest;
a first comparator to compare the coordinate values of the boundaries of the drawn field with the coordinate values of the end points of the graphic element of interest;
a comparison result register to store comparison results output by the first comparator;
a decoder to determine, based on the comparison results, whether the graphical element of interest should be drawn in the drawn field; and
first and second selectors, wherein the first selector supplies one of the coordinate values of the boundaries to the first comparator, and the second s elector supplies one of the coordinate values of the end points to a second comparator.

2. A graphics processing apparatus, comprising:
a drawn field register to store coordinate values of boundaries of a drawn field;
an end point coordinate register to store coordinate values of end points of a graphical element of interest;
a first comparator to compare the coordinate values of the boundaries of the drawn field with the coordinate values of the end points of the graphic element of interest;
a comparison result register to store comparison results output by the first comparator;
a decoder to determine, based on the comparison results, whether the graphical element of interest should be drawn in the drawn field; and
a second comparator, wherein the first comparator performs a first comparing operation on first combinations of the coordinate values of the boundaries and those of the end points, the second comparator performs a second comparing operation on second combinations of the coordinate values of the boundaries and those of the end points, and the comparison result registers store comparison results of the first and second comparators.

3. The graphics processing apparatus of claim 2, further comprising
a first selector to supply one of the coordinate values of the boundaries to the first comparator;
a second selector to supply one of the coordinate values of the end points to the first and second comparators
a third selector to supply another one of the coordinate values of the boundaries to the second selector.

4. A graphics processing apparatus, comprising:
a drawn field register to store coordinate values of boundaries of a drawn field;
an end point coordinate register to store coordinate values of end points of a graphical element of interest;
a first comparator to compare the coordinate values of the boundaries of the drawn field with the coordinate values of the end points of the graphic element of interest;
a comparison result register to store comparison results output by the first comparator; and
a decoder to determine, based on the comparison results, whether the graphical element of interest should be drawn in the drawn field,
wherein the first comparator includes a plurality of comparator parts to perform comparing operations on respective combinations of the coordinate values of the boundaries and those of the end points, and the comparison result register stores comparison results of the comparator parts.

5. The graphics processing apparatus of claim 4, wherein:
the comparator parts are connected to the decoder; and
the comparison results stored in the comparison result register are applied to the decoder.

6. A graphics processing apparatus, comprising:
a drawn field register to store coordinate values of boundaries of a drawn field;
an end point coordinate register to store coordinate values of end points of a graphical element of interest;
a first comparator to compare the coordinate values of the boundaries of the drawn field with the coordinate values of the end points of the graphic element of interest;
a comparison result register to store comparison results output by the first comparator;
and
a decoder to determine, based on the comparison results, whether the graphical element of interest should be drawn in the drawn field,
wherein when the coordinate values of the end points are changed, the first comparator compares only changed coordinate values of the end points with the coordinate values of the boundaries, and
the comparison results stored in the comparison result register are changed in accordance with comparison results related to the only changed coordinate values.

7. A graphics processing apparatus, comprising:
a drawn field register to store coordinate values of boundaries of a drawn field;
an end point coordinate register to store coordinate values of end points of a graphical element of interest;
a first comparator to compare the coordinate values of the boundaries of the drawn field with the coordinate values of the end points of the graphic element of interest;
a comparison result register to store comparison results output by the first comparator; and
a decoder to determine, based on the comparison results, whether the graphical element of interest should be drawn in the drawn field,
wherein the decoder issues an output to indicate that the graphical element of interest should not be drawn when the decoder determines that the graphical element of interest is located out of the drawn field.

8. A graphics processing apparatus, comprising:
a drawn field register to store coordinate values of boundaries of a drawn field;

an end point coordinate register to store coordinate values of end points of a graphical element of interest;

a first comparator to compare the coordinate values of the boundaries of the drawn field with the coordinate values of the end points of the graphic element of interest;

a comparison result register to store comparison results output by the first comparator; and a decoder to determine, based on the comparison results, whether the graphical element of interest should be drawn in the drawn field, wherein the drawn field register includes a constant-value output part to output a constant coordinate value.

9. A graphics processing apparatus, comprising:

a drawn field register to store coordinate values of boundaries of a drawn field;

an end point coordinate register to store coordinate values of end points of a graphical element of interest;

a first comparator to compare the coordinate values of the boundaries of the drawn field with the coordinate values of the end points of the graphic element of interest;

a comparison result register to store comparison results output by the first comparator; and a decoder to determine, based on the comparison results, whether the graphical element of interest should be drawn in the drawn field, wherein the first comparator compares only part of the coordinate values of the boundaries of the drawn field with the coordinate values of the end points, said only part of the coordinate values depending on a position of the drawn field defined on a given plane.

10. A graphics processing apparatus, comprising:

a drawn field register to store coordinate values of boundaries of a drawn field;

an end point coordinate register to store coordinate values of end points of a graphical element of interest;

a first comparator to compare the coordinate values of the boundaries of the drawn field with the coordinate values of the end points of the graphic element of interest;

a comparison result register to store comparison results output by the first comparator;

a decoder to determine, based on the comparison results, whether the graphical element of interest should be drawn in the drawn field; and a control part to control an operation of the graphics processing apparatus, part of the drawn field register and/or part of the end point coordinate register being provided in the control part.

11. The graphics processing apparatus of claim 10, further comprising a graphics element selecting unit including the drawn field register, the end point coordinate register, the first comparator, the comparison result register, and the decoder except for the part of the end point coordinate register provided in the control part.

12. The graphics processing apparatus of claim 10, further comprising a conditional branch control part supplied with an output signal of the decoder.

13. The graphics processing apparatus of claim 10, further comprising an interrupt control part to externally receive an interrupt signal.

14. A graphics processing apparatus, comprising:

a drawn field register to store coordinate values of boundaries of a drawn field;

an end point coordinate register to store coordinate values of end points of a graphical element of interest;

a first comparator to compare the coordinate values of the boundaries of the drawn field with the coordinate values of the end points of the graphic element of interest;

a comparison result register to store comparison results output by the first comparator;

a decoder to determine, based on the comparison results, whether the graphical element of interest should be drawn in the drawn field; and a graphics element selecting unit including the drawn field register, the end point coordinate register, the first comparator, the comparison result register, and the decoder.

15. A graphics processing apparatus, comprising:

a drawn field register to store coordinate values of boundaries of a drawn field;

an end point coordinate register to store coordinate values of end points of a graphical element of interest;

a first comparator to compare the coordinate values of the boundaries of the drawn field with the coordinate values of the end points of the graphic element of interest;

a comparison result register to store comparison results output by the first comparator;

a decoder to determine, based on the comparison results, whether the graphical element of interest should be drawn in the drawn field;

a coprocessor to implement the drawn field register, the end point coordinate register, and the first comparator; and a main processor to implement the comparison result register and the decoder.

16. A graphics processing apparatus, comprising:

a drawn field register to store coordinate values of boundaries of a drawn field;

an end point coordinate register to store coordinate values of end points of a graphical element of interest;

a first comparator to compare the coordinate values of the boundaries of the drawn field with the coordinate values of the end points of the graphic element of interest;

a comparison result register to store comparison results output by the first comparator;

a decoder to determine, based on the comparison results, whether the graphical element of interest should be drawn in the drawn field;

a first coprocessor to implement part of the drawn field register, part of the end point coordinate register, and part of the first comparator;

a second coprocessor to implement remaining part of the drawn field register, remaining part of the end point coordinate register, and remaining part of the first comparator; and a main processor to implement the comparison result register and the decoder.

17. A graphics processing system, comprising:

a drawn field register to store coordinate values of boundaries of a drawn field;

an end point coordinate register to store coordinate values of end points of a graphical element of interest;

a first comparator to compare the coordinate values of the boundaries of the drawn field with the coordinate values of the end points of the graphical element of interest;

a comparison result register to store comparison results output by the first comparator;

a decoder to determine, based on the comparison results, whether the graphical element of interest should be drawn in the drawn field; and and first and second selectors, wherein the first selector supplies one of the coordinate values of the boundaries to the first comparator, and the second selector supplies one of the coordinate values of the end points to a second comparator.

18. A graphics processing system, comprising:

a drawn field register to store coordinate values of boundaries of a drawn field;

an end point coordinate register to store coordinate values of end points of a graphical element of interest;

a first comparator to compare the coordinate values of the boundaries of the drawn field with the coordinate values of the end points of the graphical element of interest;

a comparison result register to store comparison results output by the first comparator;

a decoder to determine, based on the comparison results, whether the graphical element of interest should be drawn in the drawn field; and a second comparator, wherein the first comparator performs a first comparing operation on first combinations of the coordinate values of the boundaries and those of the end points, the second comparator performs a second comparing operation on second combinations of the coordinate values of the boundaries and those of the end points, and the comparison result registers store comparison results of the first and second comparators.

19. A graphics processing system, comprising:

a drawn field register to store coordinate values of boundaries of a drawn field;

an end point coordinate register to store coordinate values of end points of a graphic element of interest;

a first comparator to compare the coordinate values of the boundaries of the drawn field with the coordinate values of the end points of the graphical element of interest;

a comparison result register to store comparison results output by the first comparator;

a decoder to determine, based on the comparison results, whether the graphical element of interest should be drawn in the drawn field;

a coprocessor implementing the drawn field register, the end point coordinate register, and the first comparator;

a main processor implementing the comparison result register and the decoder; and first and second selectors, wherein the first selector supplies one of the coordinate values of the boundaries to the first comparator, and the second selector supplies one of the coordinate values of the end points to the second comparator.

20. A graphics processing system, comprising:

a drawn field register to store coordinate values of boundaries of a drawn field;

an end point coordinate register to store coordinate values of end points of a graphic element of interest;

a first comparator to compare the coordinate values of the boundaries of the drawn field with the coordinate values of the end points of the graphical element of interest;

a comparison result register to store comparison results output by the first comparator;

a decoder to determine, based on the comparison results, whether the graphical element of interest should be drawn in the drawn field;

a coprocessor implementing the drawn field register, the end point coordinate register, and the first comparator;

a main processor implementing the comparison result register and the decoder; and a second comparator, wherein the first comparator performs a first comparing operation on first combinations of the coordinate values of the boundaries and those of the end points, the second comparator performs a second comparing operation on second combinations of the coordinate values of the boundaries and those of the end points, and the comparison result registers store comparison results of the first and second comparators.

* * * * *

UNITED STATES PATENT AND TRADEMARK OFFICE
CERTIFICATE OF CORRECTION

PATENT NO. : 6,414,692 B1
DATED : July 2, 2002
INVENTOR(S) : Munenori Takimoto

It is certified that error appears in the above-identified patent and that said Letters Patent is hereby corrected as shown below:

Column 19,
Line 31, change "s elector" to -- selector --.

Column 21,
Line 13, begin a new paragraph with -- wherein --.

Signed and Sealed this

Nineteenth Day of November, 2002

Attest:

Attesting Officer

JAMES E. ROGAN
Director of the United States Patent and Trademark Office